(12) United States Patent
Masuda et al.

(10) Patent No.: US 9,648,077 B2
(45) Date of Patent: May 9, 2017

(54) CLIENT APPARATUS AND SYSTEM

(71) Applicants: Masaya Masuda, Kanagawa (JP);
Munetake Moroyama, Tokyo (JP)

(72) Inventors: Masaya Masuda, Kanagawa (JP);
Munetake Moroyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 267 days.

(21) Appl. No.: 14/010,666

(22) Filed: Aug. 27, 2013

(65) Prior Publication Data

US 2014/0074974 A1    Mar. 13, 2014

(30) Foreign Application Priority Data

Sep. 7, 2012    (JP) ................. 2012-196952

(51) Int. Cl.
*G06F 15/173* (2006.01)
*H04L 29/08* (2006.01)
*G06F 3/12* (2006.01)

(52) U.S. Cl.
CPC ............ *H04L 67/02* (2013.01); *G06F 3/1203* (2013.01); *G06F 3/1268* (2013.01); *G06F 3/1285* (2013.01); *G06F 3/1257* (2013.01); *G06F 3/1287* (2013.01); *G06F 3/1288* (2013.01)

(58) Field of Classification Search
CPC .... G06F 3/1203; G06F 3/1253; G06F 3/1268; G06F 3/1288
See application file for complete search history.

(56) References Cited

U.S. PATENT DOCUMENTS

| | | | |
|---|---|---|---|
| 8,189,225 B1* | 5/2012 | Lo | H04L 67/2842 |
| | | | 709/229 |
| 8,370,903 B2 | 2/2013 | Teramoto et al. | |
| 2006/0001907 A1* | 1/2006 | Kumagai | 358/1.15 |
| 2007/0121147 A1* | 5/2007 | Corona | G06F 3/1206 |
| | | | 358/1.15 |
| 2007/0130473 A1* | 6/2007 | Mazotas | 713/183 |
| 2008/0282333 A1* | 11/2008 | Teramoto et al. | 726/8 |
| 2009/0059287 A1* | 3/2009 | Yamada | 358/1.15 |
| 2011/0004755 A1* | 1/2011 | Ueno | G06F 21/31 |
| | | | 713/168 |

(Continued)

FOREIGN PATENT DOCUMENTS

| | | |
|---|---|---|
| JP | 2007-060163 | 3/2007 |
| JP | 2008-052679 | 3/2008 |

(Continued)

*Primary Examiner* — Hamza Algibhah
(74) *Attorney, Agent, or Firm* — IPUSA, PLLC

(57) ABSTRACT

A data processing apparatus connected to an output apparatus and a service providing apparatus via a network, includes a destination setting storing unit that stores a setting of the destination for sending the output data; an output request accepting unit that accepts an output request of the output data from a user; and a sending control unit that controls to send the output data to the destination in accordance with the determined setting of the destination, wherein when the destination of the output data is the service providing apparatus, the sending control unit sends the output data to the service providing apparatus after having a log-in requesting unit perform a log-in to the service providing apparatus in accordance with the determined setting of the destination.

19 Claims, 30 Drawing Sheets

(56) References Cited

U.S. PATENT DOCUMENTS

| | | | |
|---|---|---|---|
| 2011/0122439 A1* | 5/2011 | Sato et al. | 358/1.15 |
| 2011/0157631 A1* | 6/2011 | Tsutsumi | 358/1.15 |
| 2013/0083343 A1* | 4/2013 | Ohara | G06F 3/1219 358/1.13 |
| 2013/0205360 A1* | 8/2013 | Novak | H04L 63/0884 726/1 |
| 2013/0332424 A1* | 12/2013 | Nos et al. | 707/687 |

FOREIGN PATENT DOCUMENTS

| | | | |
|---|---|---|---|
| JP | 2008052679 A | * | 3/2008 |
| JP | 2008-282216 | | 11/2008 |
| JP | 2011-192119 | | 9/2011 |

* cited by examiner

| COMPANY CODE | COMPANY NAME | COUNTRY | LANGUAGE | ... |
|---|---|---|---|---|
| XXX | COMPANY A | JAPAN | JAPANESE | |
| YYY | COMPANY B | THE U.S. | ENGLISH | |

FIG.9

| COMPANY CODE | USER NAME | PASSWORD | ROLE | ADDRESS DATA | OUTPUT SETTING | ... | ... |
|---|---|---|---|---|---|---|---|
| XXX | USER A | AAA | ADMINISTRATOR | A@aaa.com | DUPLEX, COLOR | | |
| | USER B | BBB | ORDINARY USER | B@aaa.com | SINGLE, COLOR | | |
| | USER C | CCC | ORDINARY USER | C@aaa.com | DUPLEX, MONOCHROME | | |
| YYY | USER A | AAA | ADMINISTRATOR | A@bbb.com | SINGLE, 4IN1 | | |
| | USER D | DDD | ORDINARY USER | D@bbb.com | DUPLEX, 2IN1 | | |

FIG.10

| COMPANY CODE | DEVICE AUTHENTICATION INFORMATION | BUSINESS ESTABLISHMENT INFORMATION | CAPABILITY | ... |
|---|---|---|---|---|
| XXX | 111 | A | A4 COLOR | |
| | 222 | B | A2 COLOR | |
| | 333 | B | A4 MONOCHROME | |
| YYY | 444 | — | A4 COLOR | |

FIG.11

| JOB ID | INPUT DATA URL | CONVERSION DATA URL1 | CONVERSION DATA URL2 | ... | CONVERSION STATUS |
|---|---|---|---|---|---|
| 1 | Job1/storage | Job11/storage | Job111/storage | | COMPLETED |
| 2 | Job2/storage | Job22/storage | — | | COMPLETED |
| 3 | Job3/storage | Job33/storage | — | | BEING CONVERTED |
| 4 | Job4/storage | Job44/storage | Job444/storage | | BEING CONVERTED |
| 5 | Job5/storage | Job55/storage | — | | COMPLETED |

FIG.12A

| OUTPUT DATA ID | COMPANY CODE | USER INFORMATION | BIBLIOGRAPHIC DATA | JOB ID | CONVERSION STATUS |
|---|---|---|---|---|---|
| 1 | XXX | USER A | ... | 1 | BEING CONVERTED |
| 2 | XXX | USER B | ... | 2 | BEING CONVERTED |
| 3 | XXX | USER C | ... | 3 | BEING CONVERTED |
| 4 | XXX | USER A | ... | 4 | BEING CONVERTED |
| 5 | YYY | USER D | ... | 5 | BEING CONVERTED |

FIG.12B

| OUTPUT DATA ID | COMPANY CODE | USER INFORMATION | BIBLIOGRAPHIC DATA | JOB ID | CONVERSION STATUS |
|---|---|---|---|---|---|
| 1 | XXX | USER A | ... | 1 | COMPLETED |
| 2 | XXX | USER B | ... | 2 | COMPLETED |
| 3 | XXX | USER C | ... | 3 | BEING CONVERTED |
| 4 | XXX | USER A | ... | 4 | BEING CONVERTED |
| 5 | YYY | USER D | ... | 5 | COMPLETED |

FIG.19

COMPANY CODE: XXX

USER NAME:

PASSWORD:

CANCEL　　OK

FIG.28A

| OUTPUT DATA ID | COMPANY CODE | USER INFORMATION | BIBLIOGRAPHIC DATA | JOB ID | STATUS |
|---|---|---|---|---|---|
| 1 | XXX | USER A | ... | 1 | ALREADY OUTPUT |
| 2 | XXX | USER B | ... | 2 | ALREADY OUTPUT |
|   | XXX | USER A | ... |   | ALREADY OUTPUT |
| 3 | XXX | USER C | ... | 3 | DELETED |
| 5 | YYY | USER D | ... | 5 | ALREADY OUTPUT |
|   | YYY | USER D | ... |   | ALREADY OUTPUT |

FIG.28B

| OUTPUT DATA ID | COMPANY CODE | USER INFORMATION | BIBLIOGRAPHIC DATA | JOB ID | STATUS | FIXED VALUE OR INPUT VALUE |
|---|---|---|---|---|---|---|
| 1 | XXX | USER A | ... | 1 | ALREADY OUTPUT |   |
| 2 | XXX | USER B | ... | 2 | ALREADY OUTPUT |   |
|   | XXX | USER A | ... |   | ALREADY OUTPUT | FIXED VALUE |
| 3 | XXX | USER C | ... | 3 | DELETED |   |
| 5 | YYY | USER D | ... | 5 | ALREADY OUTPUT |   |
|   | YYY | USER D | ... |   | ALREADY OUTPUT | INPUT VALUE |

FIG.29A

SENDING CONDITION TO SERVICE PROVIDING SYSTEM

■ NOT TO SEND
☐ SEND LOGS OF ALL DIRECT PRINTS
☐ SEND LOGS OF DIRECT PRINTS OF SELECTED MULTIFUNCTION DEVICES

ID WHEN SENDING OUTPUT LOG
☐ USE FIXED VALUE  [REGISTER FIXED VALUE]
☐ USED INPUT VALUE

[REGISTRATION]

FIG.29B

SENDING CONDITION TO SERVICE PROVIDING SYSTEM

☐ NOT TO SEND
☐ SEND LOGS OF ALL DIRECT PRINTS
■ SEND LOGS OF DIRECT PRINTS OF SELECTED MULTIFUNCTION DEVICES

| MULTIFUNCTION DEVICE 1 | ▶ |
| MULTIFUNCTION DEVICE 4 | ▶ |

ID WHEN SENDING OUTPUT LOG
☐ USE FIXED VALUE  [REGISTER FIXED VALUE]
■ USED INPUT VALUE

[REGISTRATION]

FIG.29C

SENDING CONDITION TO SERVICE PROVIDING SYSTEM

☐ NOT TO SEND
■ SEND LOGS OF ALL DIRECT PRINTS
☐ SEND LOGS OF DIRECT PRINTS OF SELECTED MULTIFUNCTION DEVICES

ID WHEN SENDING OUTPUT LOG
■ USE FIXED VALUE  [REGISTER FIXED VALUE]
☐ USED INPUT VALUE

[REGISTRATION]

FIG.30

COMPANY ID: Company A

User ID: Administrator

Password: ******

REGISTRA
-TION

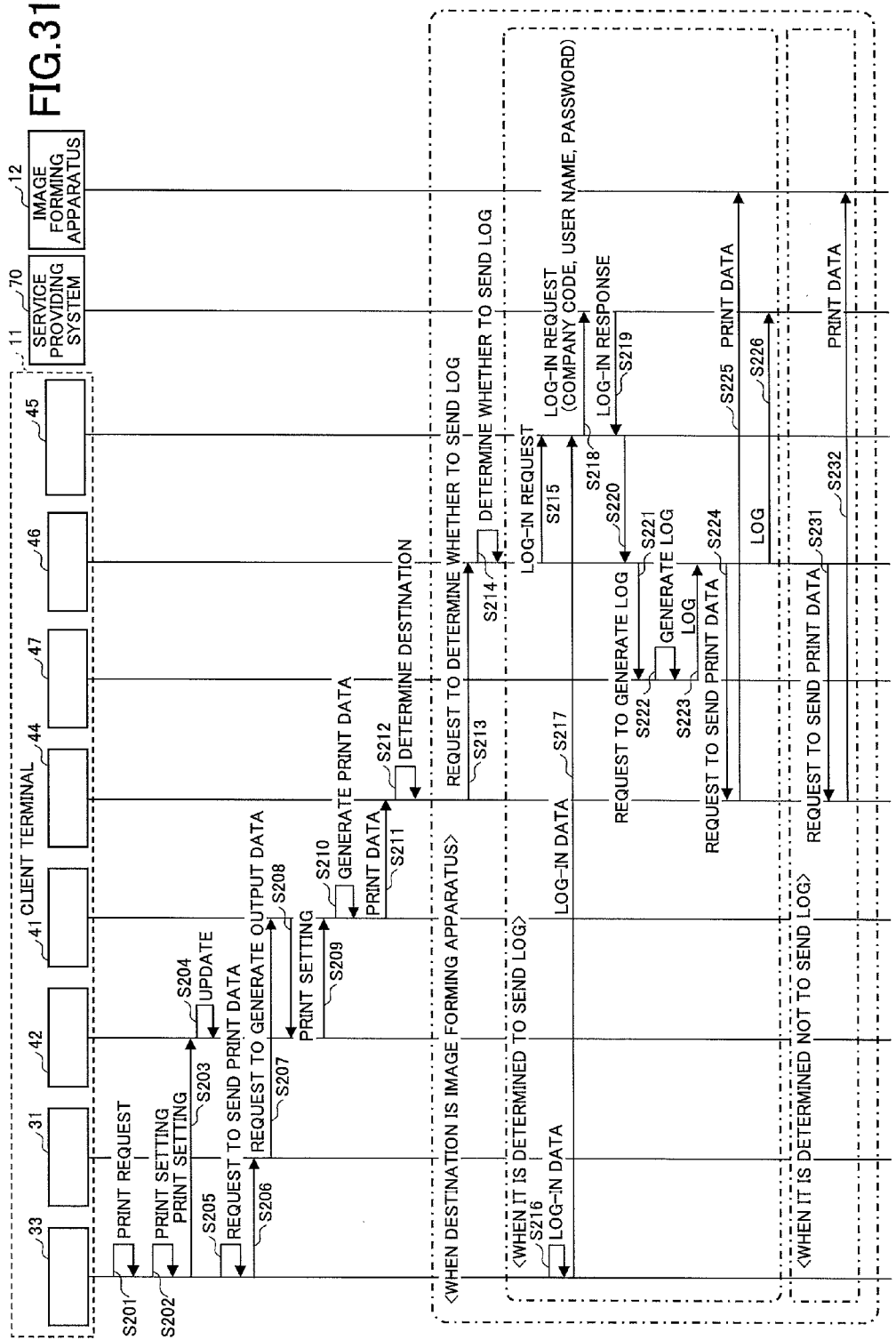

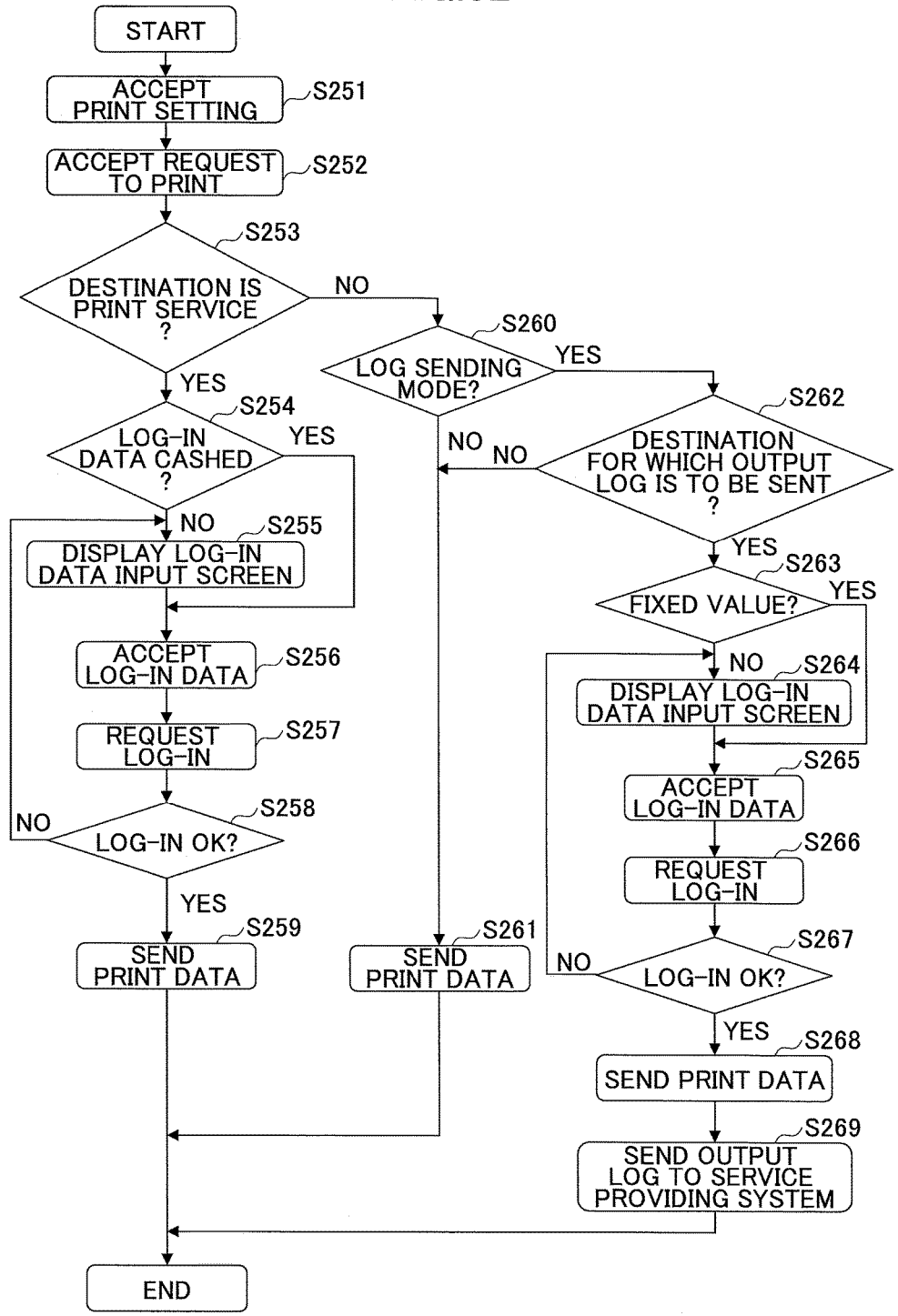

CLIENT APPARATUS AND SYSTEM

BACKGROUND OF THE INVENTION

1. Field of the Invention

The present invention relates to a data processing apparatus and a system.

2. Description of the Related Art

A system is known in which a client terminal, a print server and a multifunction device are connected via a network (see Patent Document 1, for example).

In the known system, print data is generated in the client terminal. Then, the client terminal sends the generated print data to the print server and the print server stores the print data. The multifunction device obtains the print data from the print server when printing the print data.

Recently, embodiments have been widely disseminated in which the client terminal uses various services, typically a cloud service. In such embodiments, the functions of the conventional print server and the multifunction device are provided as a print service so that a similar function as the print server is provided by the print service and it is unnecessary for a user to prepare a print server.

However, in the conventional system, user interfaces for a method in which the print data is sent from the client terminal to the image forming apparatus to have the print data printed, and for a method in which the print data is printed by the print service, are different, and this was inconvenient for the user.

Further, while not limited to printing, this problem exists for an embodiment in which user interfaces are different for a method in which a process is executed by an apparatus such as an image forming apparatus, a projector or the like, and a method in which the process is executed by a service, based on an instruction from a client terminal.

Patent Document

[Patent Document 1] Japanese Laid-open Patent Publication No. 2007-60163

SUMMARY OF THE INVENTION

The present invention is made in light of the above problems, and provides a data processing apparatus and a system capable of accepting execution of different processes via a common user interface.

According to an embodiment, there is provided a data processing apparatus connected to an output apparatus that outputs output data and a service providing apparatus that provides a service related to the output data via a network, including a destination setting storing unit that stores, for a destination to which the output data is capable of being sent, a setting of the destination for sending the output data; an output request accepting unit that accepts an output request of the output data for which the destination is selected, from a user; and a sending control unit that determines the setting of the destination to which the output data is to be sent based on the output request of the output data for which the destination is selected and the setting of the destination stored in the destination setting storing unit and controls to send the output data to the destination in accordance with the determined setting of the destination, wherein when the destination of the output data is the output apparatus, the sending control unit sends the output data to the output apparatus in accordance with the determined setting of the destination and wherein when the destination of the output data is the service providing apparatus, the sending control unit sends the output data to the service providing apparatus after having a log-in requesting unit perform a log-in to the service providing apparatus in accordance with the determined setting of the destination.

According to another embodiment, there is provided a system in which a data processing apparatus that sends output data, an output apparatus that outputs output data; and a service providing apparatus that provides a service related to the output data are connected with each other via a network, including a destination setting storing unit that stores, for a destination to which the output data is capable of being sent, a setting of the destination for sending the output data; an output request accepting unit that accepts an output request of the output data for which the destination is selected, from a user at the data processing apparatus; and a sending control unit that determines the setting of the destination to which the output data is to be sent based on the output request of the output data for which the destination is selected and the setting of the destination stored in the destination setting storing unit and controls to send the output data to the destination in accordance with the determined setting of the destination, wherein when the destination of the output data is the output apparatus, the sending control unit sends the output data to the output apparatus in accordance with the determined setting of the destination and wherein when the destination of the output data is the service providing apparatus, the sending control unit sends the output data to the service providing apparatus after having a log-in requesting unit perform a log-in to the service providing apparatus in accordance with the determined setting of the destination.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 9 is a view illustrating an example a data structure of user management data;

FIG. 10 is a view illustrating an example of a data structure of device management data;

FIG. 11 is a view illustrating an example of a data structure of data management data;

FIG. 12A and FIG. 12B are views illustrating examples of a data structure of output data management data, respectively;

FIG. 19 is an image diagram illustrating an example of a log-in data input screen;

FIG. 28A and FIG. 28B are views illustrating an example of output log, respectively;

FIG. 29A, FIG. 29B and FIG. 29C are image diagrams illustrating an example of a setting of a sending log screen, respectively;

FIG. 30 is an image diagram illustrating an example of a fixed value registration screen;

FIG. 31 is a sequence diagram illustrating an example of an output data inputting process; and FIG. 32 is a flowchart illustrating an example of a process of sending an output log.

DETAILED DESCRIPTION OF THE PREFERRED EMBODIMENTS

Figure 1:
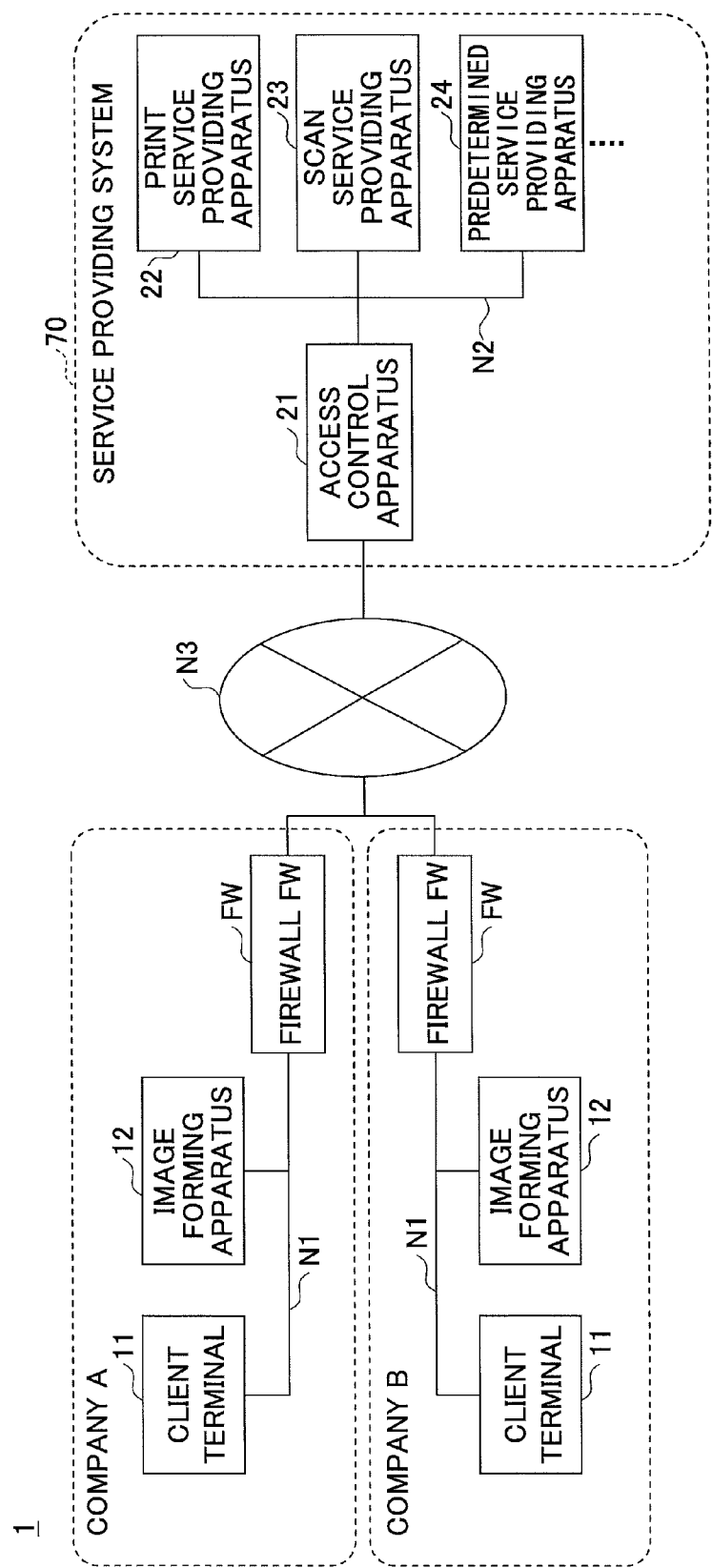
FIG. 1 is a view illustrating an example of a system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment (System Structure)

FIG. 1 is a view illustrating an example of a system 1 of a first embodiment.

The system 1 includes networks in companies A and B, for example, and a service providing system 70 that provides a service such as a cloud service. The networks in the companies A and B are similar, and thus, the network in the company A is explained in the following.

In the company A, a client terminal 11, an image forming apparatus 12 and a firewall FW that are connected to a private network N1 such as an in-company network or the like are provided. The service providing system 70 includes an access control apparatus 21 and one or more service providing apparatus(es) such as a print service providing apparatus 22, a scan service providing apparatus 23 and a predetermined service providing apparatus 24 that are connected to a network N2.

The system 1 further includes a network N3 such as INTERNET.

The network N1 and the network N3 are connected via the firewall FW provided at the network N1 side. The firewall FW is provided at a connecting point between the network N1 and the network N3 to relay a communication between the network N1 to the network N3.

The network N2 and the network N3 are connected via the access control apparatus 21 provided at the network N2 side. The security of the network N2 is ensured by the access control apparatus 21.

The network N1 is a private network which is provided inside the firewall FW.

The client terminal 11 is an example of a terminal device. The client terminal 11 may be a data processing apparatus (computer system) on which a general OS or the like is mounted. The client terminal 11 has a wireless or wired communication function. The client terminal 11 is a tablet PC, a notebook PC or the like capable of being operated by a user.

The image forming apparatus 12 has an image forming function and may be a multifunction device, a copying machine, a scanner, a printer, a laser printer or the like, for example. The image forming apparatus 12 has a wireless or wired communication function.

Although a single client terminal 11 and a single image forming apparatus 12 are exemplified in FIG. 1 for each of the companies, each of the companies may have a plurality of client terminals 11 and a plurality of image forming apparatuses 12.

The print service providing apparatus 22 provides a print service. The scan service providing apparatus 23 provides a scan service. The predetermined service providing apparatus 24 provides a predetermined service. The access control apparatus 21 controls an access to the services such as the print service, the scan service, the predetermined service or the like provided by the print service providing apparatus 22, the scan service providing apparatus 23, the predetermined service providing apparatus 24 or the like, respectively.

The access control apparatus 21, the print service providing apparatus 22, the scan service providing apparatus 23 and the predetermined service providing apparatus 24 are actualized by a computer system including one or more data processing apparatus(es).

The print service providing apparatus 22, the scan service providing apparatus 23 and the predetermined service providing apparatus 24 of the system 1 illustrated in FIG. 1 may be actualized by a single computer or dispersedly actualized by a plurality of computers. Further, a part of the functions of the service providing system 70 may be provided at the company side (the network N1 side) in the system 1 and the client terminal 11 or the image forming apparatus 12 may be provided on a network other than the network N1.

When a user wants to send print data from the client terminal 11, which includes a printer driver, to the image forming apparatus 12 to have the image forming apparatus 12 perform a printing operation, the user may set the image forming apparatus 12 as a destination to send the print data via a print setting screen or the like of application having a printing function, which is mounted on the client terminal 11.

Similarly, when the user wants to send the print data from the client terminal 11 including the printer driver to the print service providing apparatus 22 included in the service providing system 70 to have the print data printed using the print service provided by the print service providing apparatus 22, the user may set the print service providing apparatus 22 as a destination to send the print data via the print setting screen or the like of the application having the printing function, which is mounted on the client terminal 11.

Here, when the access to the print service providing apparatus 22 is controlled, for example, by the access control apparatus 21, it is necessary for the client terminal 11 to request a log-in and send the print data to the print service providing apparatus 22 after the log-in is succeeded, as will be explained later.

As such, when it is necessary to perform a log-in process in accordance with the destination to send the print data, the client terminal 11 appropriately performs a necessary process for sending the print data. The client terminal 11 is configured to perform an appropriate process in accordance with the destination to send the print data print data, as will be explained later.

In this embodiment, a user can use a common user interface, which is the print setting screen of the application having the printing function, for a case when the print data is sent to the image forming apparatus 12 to be printed and for a case when the print data is sent to the print service providing apparatus 22 so that the print data is printed using the print service provided by the print service providing apparatus 22, from the client terminal 11 including the printer driver. Thus, inconvenience for the user can be prevented.

(Hardware Structure)

Figure 2:
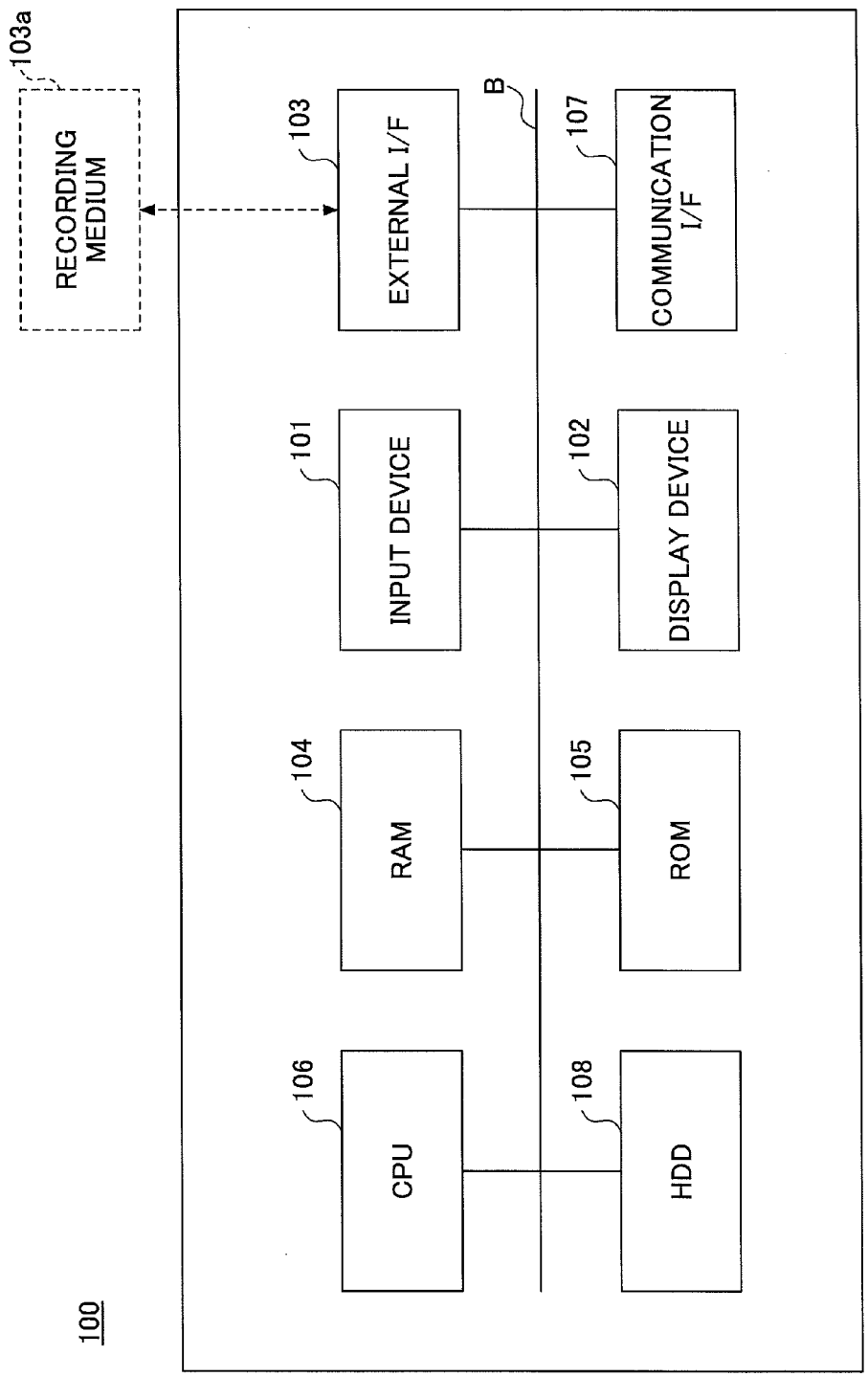
FIG. 2 is a view illustrating an example of a hardware structure of a computer system of the embodiment.

The client terminal 11, the access control apparatus 21, the print service providing apparatus 22, the scan service providing apparatus 23 and the predetermined service providing apparatus 24 illustrated in FIG. 1 are actualized by a computer system 100 having a hardware structure illustrated in FIG. 2, for example. FIG. 2 is a view illustrating an example of the hardware structure of the computer system 100 of the first embodiment.

The computer system 100 includes an input device 101, a display device 102, an external I/F 103, a Random Access Memory (RAM) 104, a Read Only Memory (ROM) 105, a Central Processing Unit (CPU) 106, a communication I/F 107, a Hard Disk Drive (HDD) 108 and the like that are connected with each other via a bus B.

The input device 101 includes a keyboard, a mouse, a touch panel or the like, and is used for the user to input various operation signals. The display device 102 includes a display or the like, and displays a processed result by the computer system 100.

The communication I/F 107 is an interface that connects the computer system 100 to the network N1, N2 or N3. With this configuration, the computer system 100 is capable of performing data communication via the communication I/F 107.

The HDD 108 is a non-volatile storing device that stores a program or data. The program or data stored in the HDD 108 may be, for example, an Operating System (OS), which is basic software that controls the entirety of the computer system 100, application software that provide various functions on the OS or the like. The HDD 108 manages the stored program or data by a predetermined file system and/or a data base (DB).

The external I/F 103 is an interface for an external device. The external device may be a recording medium 103a or the like. With this configuration, the computer system 100 is capable of reading and writing data on the recording medium 103a via the external I/F 103. The recording medium 103a may be a flexible disk, a Compact Disk (CD), a Digital Versatile Disk (DVD), an SD Memory card, a Universal Serial Bus memory (USB memory) or the like.

The ROM 105 is a non-volatile semiconductor memory (storing device) capable of retaining a program or data even when a power source is not supplied. The ROM 105 stores a program or data such as a Basic Input/Output System (BIOS) that is executed when initiating the computer system 100, OS setting, network setting or the like. The RAM 104 is a volatile semiconductor memory (storing device) that temporarily stores a program or data.

The CPU 106 is an arithmetic apparatus that controls the entirety of the computer system 100 or actualize functions of the computer system 100 by reading the program or data from the storing device such as the ROM 105, the HDD 108 or the like to the RAM 104 and executing processes.

The client terminal 11, the access control apparatus 21, the print service providing apparatus 22, the scan service providing apparatus 23 and the predetermined service providing apparatus 24 illustrated in FIG. 1 actualize various processes, which will be explained later, by the hardware structure of the computer system 100, respectively.

Figure 3:
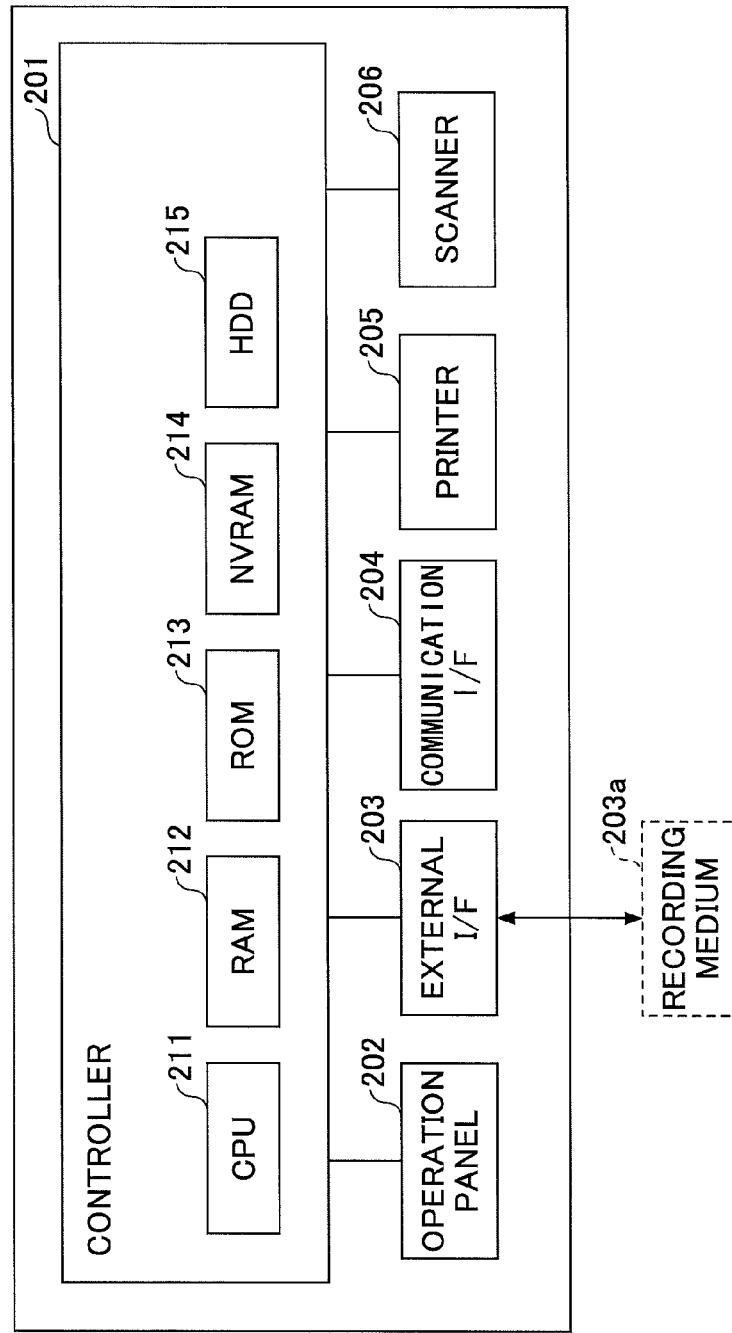
FIG. 3 is a view illustrating an example of a hardware structure of an image forming apparatus of the embodiment.

FIG. 3 is a view illustrating an example of a hardware structure of the image forming apparatus 12 of the first embodiment. The image forming apparatus 12 illustrated in FIG. 3 includes a controller 201, an operation panel 202, an external I/F 203, a communication I/F 204, a printer 205, a scanner 206 and the like.

The controller 201 includes a CPU 211, a RAM 212, a ROM 213, an NVRAM 214, a HDD 215 and the like. The ROM 213 stores a program or data. The RAM 212 temporarily stores a program or data. The NVRAM 214 stores setting data or the like, for example. The HDD 215 stores a program or data.

The CPU 211 controls the entirety of the image forming apparatus 12 or actualizes the functions of the image forming apparatus 12 by reading the program or data, the setting data or the like from the ROM 213, the NVRAM 214, the HDD 215 or the like to the RAM 212 to execute processes.

The operation panel 202 includes an input unit that accepts an input from a user and a display unit that displays various information. The external I/F 203 is an interface with an external device. The external device may be a recording medium 203a or the like. With this configuration, the image forming apparatus 12 is capable of reading and writing data on the recording medium 203a via the external I/F 203. The recording medium 203a may be an IC card, a flexible disk, a CD, a DVD, an SD memory card, a USB memory or the like.

The communication I/F 204 is an interface that connects the image forming apparatus 12 to the network N1. With this configuration, the image forming apparatus 12 is capable of performing data communication via the communication I/F 204.

The printer 205 has a function to print print data on a paper or the like. The scanner 206 has a function to read image data from a document. The image forming apparatus 12 of the embodiment actualizes various processes, which will be explained later, by the above described hardware structure.

(Software Structure)
(Client Terminal)

Figure 4:
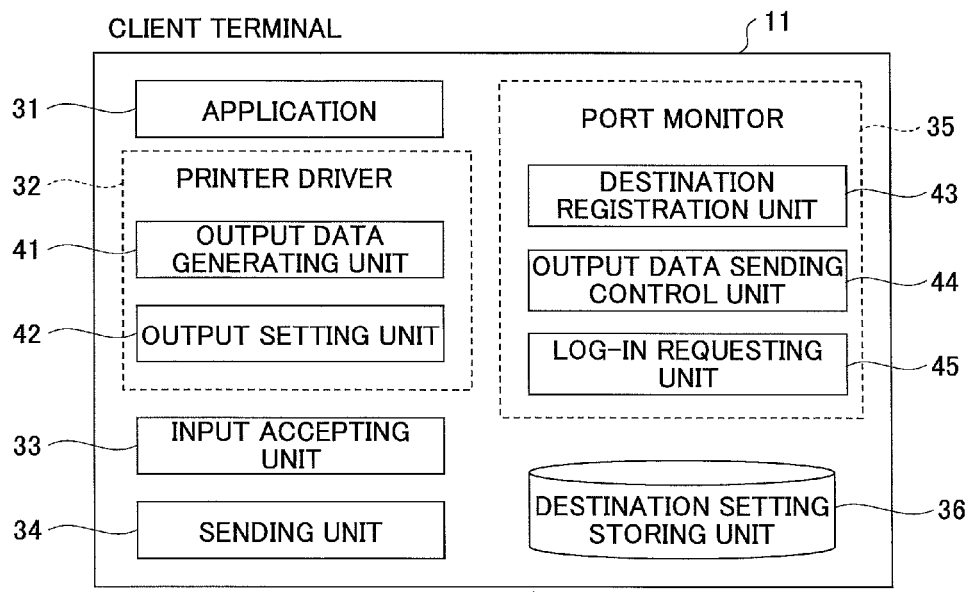
FIG. 4 is a functional block diagram illustrating an example of a software structure of a client terminal of the embodiment.

The functions of the client terminal 11 are actualized by components illustrated in FIG. 4, for example. FIG. 4 is a functional block diagram illustrating an example of a software structure of the client terminal 11 of the first embodiment.

The client terminal 11 includes an application 31, a printer driver 32, an input accepting unit 33 (which is an example of an output request accepting unit), a sending unit 34, a port monitor 35 and a destination setting storing unit 36.

The application 31 is software having a printing function such as software for word-processing, a spreadsheet program or the like. The printer driver 32 is an example of a device driver that controls the image forming apparatus 12, the print service providing apparatus 22 or the like.

The printer driver 32 includes (actualizes) an output data generating unit 41 and an output setting unit 42. The output data generating unit 41 generates print data as an example of output data. The output setting unit 42 accepts a print setting as an example of an output setting.

The input accepting unit 33 accepts an input of a user operation such as a contacting operation to a touch panel, an input operation of a keyboard or the like. The sending unit 34 sends the print data, for example, to the image forming apparatus 12 or the print service providing apparatus 22 of the service providing system 70.

The port monitor 35 controls an I/O port of the image forming apparatus 12 or the service providing system 70 side. The port monitor 35 includes a destination registration unit 43, an output data sending control unit 44 (which is an example of an output data sending control unit) and a log-in requesting unit 45.

The destination registration unit 43 accepts a setting of a destination of the print data from the user via the port, and registers the setting of the destination in the destination setting storing unit 36. The output data sending control unit 44 controls the destination to send the print data based on the setting of the destination registered in the destination setting storing unit 36. The log-in requesting unit 45 requests log-in to the print service providing apparatus 22, for example, to the service providing system 70 using input authentication information such as user name, a password or the like. The destination setting storing unit 36 stores a setting of a destination of the print data, for example.

(Image Forming Apparatus)

Figure 5:
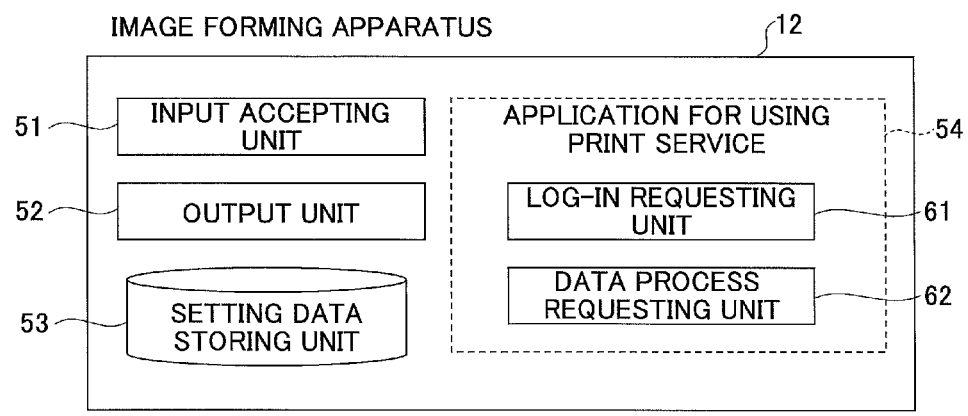
FIG. 5 is a functional block diagram illustrating an example of a software structure of the image forming apparatus of the embodiment.

The functions of the image forming apparatus 12 are actualized by components illustrated in FIG. 5, for example. FIG. 5 is a functional block diagram illustrating an example of a software structure of the image forming apparatus 12 of the first embodiment.

The image forming apparatus 12 includes an input accepting unit 51, an output unit 52, a setting data storing unit 53 and application for using print service 54.

The input accepting unit 51 accepts an input of a user operation such as a contacting operation to a touch panel, an input operation of a keyboard or the like. The output unit 52 outputs a received job. For example, the output unit 52 prints received print data. The setting data storing unit 53 stores a company code and device authentication information that are previously determined, which will be explained later.

The application for using print service 54 is software for using the print service provided by the print service providing apparatus 22. The application for using print service 54 includes (actualizes) a log-in requesting unit 61 and a data process requesting unit 62.

The log-in requesting unit 61 requests log-in to the print service providing apparatus 22, for example, to the service providing system 70 using authentication information input by a user operation such as user name, a password or the like. The data process requesting unit 62 requests the print service providing apparatus 22 to perform data processing such as sending a print data list or print data.

(Service Providing System)

Figure 6:
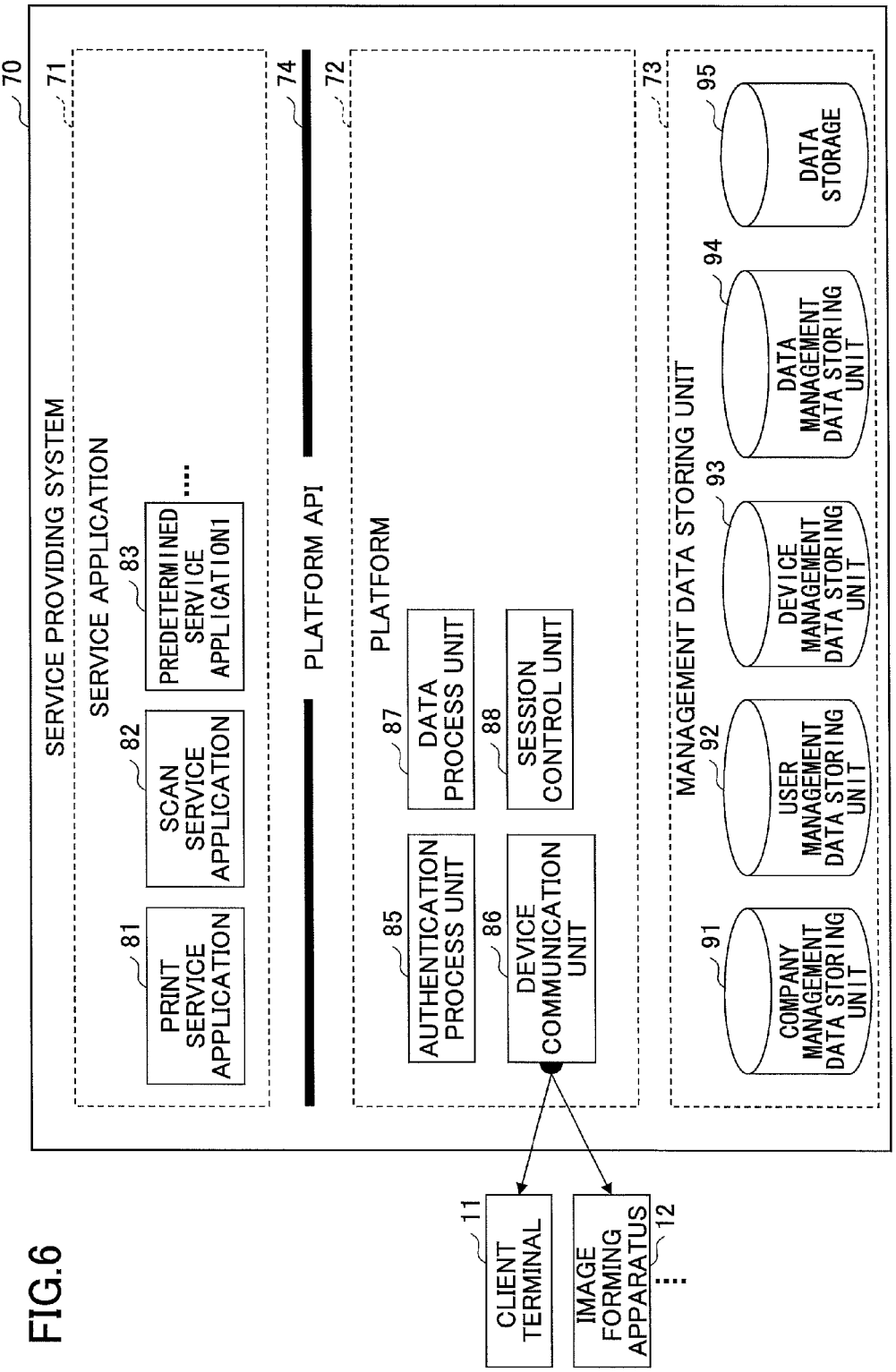
FIG. 6 is a functional block diagram illustrating an example of a software structure of a service providing system of the embodiment.

The functions of the service providing system 70 of the first embodiment are actualized by components illustrated in FIG. 6, for example. FIG. 6 is a functional block diagram illustrating an example of a software structure of the service providing system 70 of the first embodiment.

The service providing system 70 includes service application 71, a platform 72, a management data storing unit 73 and platform application programming interface (platform API) 74.

The service application 71 includes print service application 81, scan service application 82, and one or more predetermined service application 83, for example. The print service application 81 is application that provides the print service. The scan service application 82 is application that provides the scan service. The predetermined service application 83 is application that provides the predetermined service.

The platform API 74 is an interface for the service application 71 such as the print service application 81, the scan service application 82, the predetermined service application 83 or the like to use the platform 72. The platform API 74 is an interface previously defined for the platform 72 to receive a request from the service application 71, and is composed of a function, a class or the like, for example. When the service providing system 70 is dispersedly composed of a plurality of data processing apparatuses, the platform API 74 may be a Web API that is available via a network, for example.

The platform 72 includes an authentication process unit 85, a device communication unit 86, a data process unit 87 and a session control unit 88, for example.

The authentication process unit 85 performs an authentication based on a log-in request from the client terminal 11 or the image forming apparatus 12. The device communication unit 86 communicates with the client terminal 11 or the image forming apparatus 12. The data process unit 87 performs data processing based on a request from the service application 71. The session control unit 88 controls a session between the client terminal 11 or the image forming apparatus 12.

The management data storing unit 73 includes a company management data storing unit 91, a user management data storing unit 92, a device management data storing unit 93, a data management data storing unit 94 and a data storage 95, for example. The company management data storing unit 91 stores company management data, which will be explained later. The user management data storing unit 92 stores user management data, which will be explained later. The device management data storing unit 93 stores device management data, which will be explained later. The data management data storing unit 94 stores data management data, which will be explained later. The data storage 95 stores other data or the like.

Figures 7, 8:
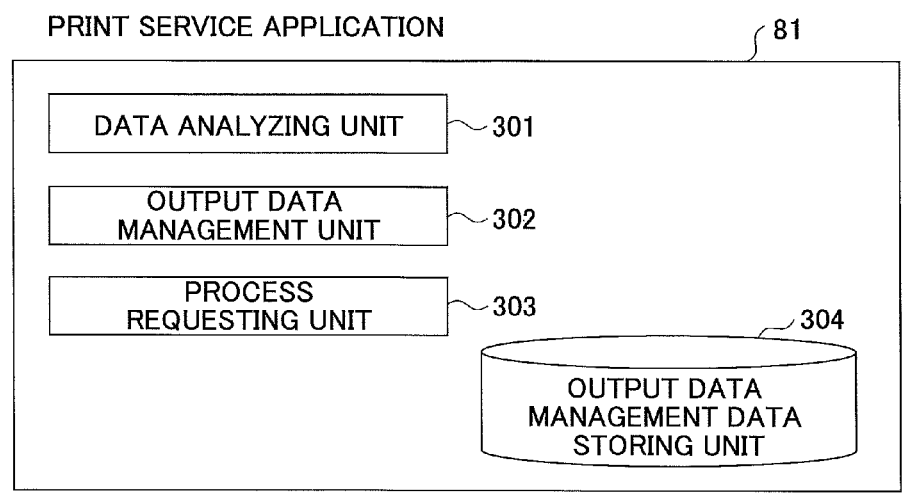
FIG. 7 is a functional block diagram illustrating an example of print service application of the embodiment.
FIG. 8 is a view illustrating an example of a data structure of company management data.

The print service application 81 of the service providing system 70 illustrated in FIG. 6 is actualized by process blocks illustrated in FIG. 7. FIG. 7 is a functional block diagram illustrating an example of the print service application 81 of the first embodiment. The print service application 81 includes a data analyzing unit 301, an output data management unit 302, a process requesting unit 303 and an output data management data storing unit 304.

The data analyzing unit 301 determines whether a data conversion is necessary for data sent from the client terminal 11 by analyzing the data. For example, when the data sent from the client terminal 11 is application data, web data or the like, the data analyzing unit 301 determines that it is necessary to convert the received data to print data.

The output data management unit 302 manages the print data, for example, sent from the client terminal 11 by output data management data, which will be explained later. The process requesting unit 303 requests the data process unit 87 of the platform 87 to perform the data processing. The output data management data storing unit 304 stores the output data management data, which will be explained later.

FIG. 8 is a view illustrating an example of a data structure of the company management data stored in the company management data storing unit 91. The company management data illustrated in FIG. 8 includes data items such as "company code", "company name", "country", "language" and the like.

The "company code" specifies a group such as a company, an organization or the like. The "company code" is unique to each company.

Although the word "company" is used here, the "company code" is not limited to a code to identify a company. The "company code" may be information for specifying a set of one or more user(s) or one or more image forming apparatus(es) 12. The "company code" may be identification information or the like that identifies a contract to a group of user(s) or the image forming apparatus(es) 12.

FIG. 9 is a view illustrating an example a data structure of the user management data stored in the user management data storing unit 92. The user management data includes data items such as "company code", "user name", "password", "role", "address data", "output setting" and the like.

The user management data manages data for each of the company codes. The "user name" and the "password" are data for specifying a user at the service providing system 70 side. The "user name" may be user ID, for example. The "password" may be optional.

Further, for the user name, information for identifying an electronic medium (IC card, for example) possessed by the user, the client terminal 11 or the image forming apparatus 12 (card ID, serial ID of the image forming apparatus 12 or the like, telephone number or the like) may be used instead or used with combination with the user name. Further, the user name corresponding to the same company code should be unique to each other, however, for the different company codes, the same user name may be used.

FIG. 10 is a view illustrating an example of a data structure of the device management data stored in the device management data storing unit 93. The device management data illustrated in FIG. 10 includes data items such as "company code", "device authentication information", "business establishment information", "capability" and the like. The device management data manages data for each of the company codes. The device authentication information is data for a device authentication that determines whether the respective image forming apparatus 12 has a specific condition. The device authentication information may be ID indicating that a specific application is mounted, a device number indicating a specific device or the like.

FIG. 11 is a view illustrating an example of a data structure of the data management data stored in the data management data storing unit 94. The data management data illustrated in FIG. 11 includes data items such as "job ID", "input data URL", one or more "conversion data URL", "conversion status" and the like. The "job ID" specifies an input print job or the like. The "input data URL" indicates a location where input data is stored. The "conversion data URL" indicates a location where data that is converted from the input data is stored. When the conversion is performed multiple times, a location where each converted data is stored is registered. The "conversion status" indicates a status of the conversion and includes "being converted", "completed" or the like.

FIG. 12A and FIG. 12B are respective views illustrating an example of a data structure of the output data management data stored in the output data management data storing unit 304. The output data management data illustrated in FIG. 12A and FIG. 12B include data items such as "output data ID", "company code", "user information", "bibliographic data", "job ID", "conversion status" and the like. The "output data management data" specifies data such as input print job or the like. The output data management data is used by the print service application 81 to determine a conversion status of the data such as the input print job or the like.

FIG. 12A is a view illustrating an example in which the conversions of the data such as the input print jobs or the like are being performed. FIG. 12B is a view illustrating an example in which a part of the conversions of the data such as the input print jobs or the like are completed from the example illustrated in FIG. 12A.

(Process in Detail)

The process of the system 1 of the embodiment is explained in detail in the following.

(Destination Registration Process)

Figure 13:
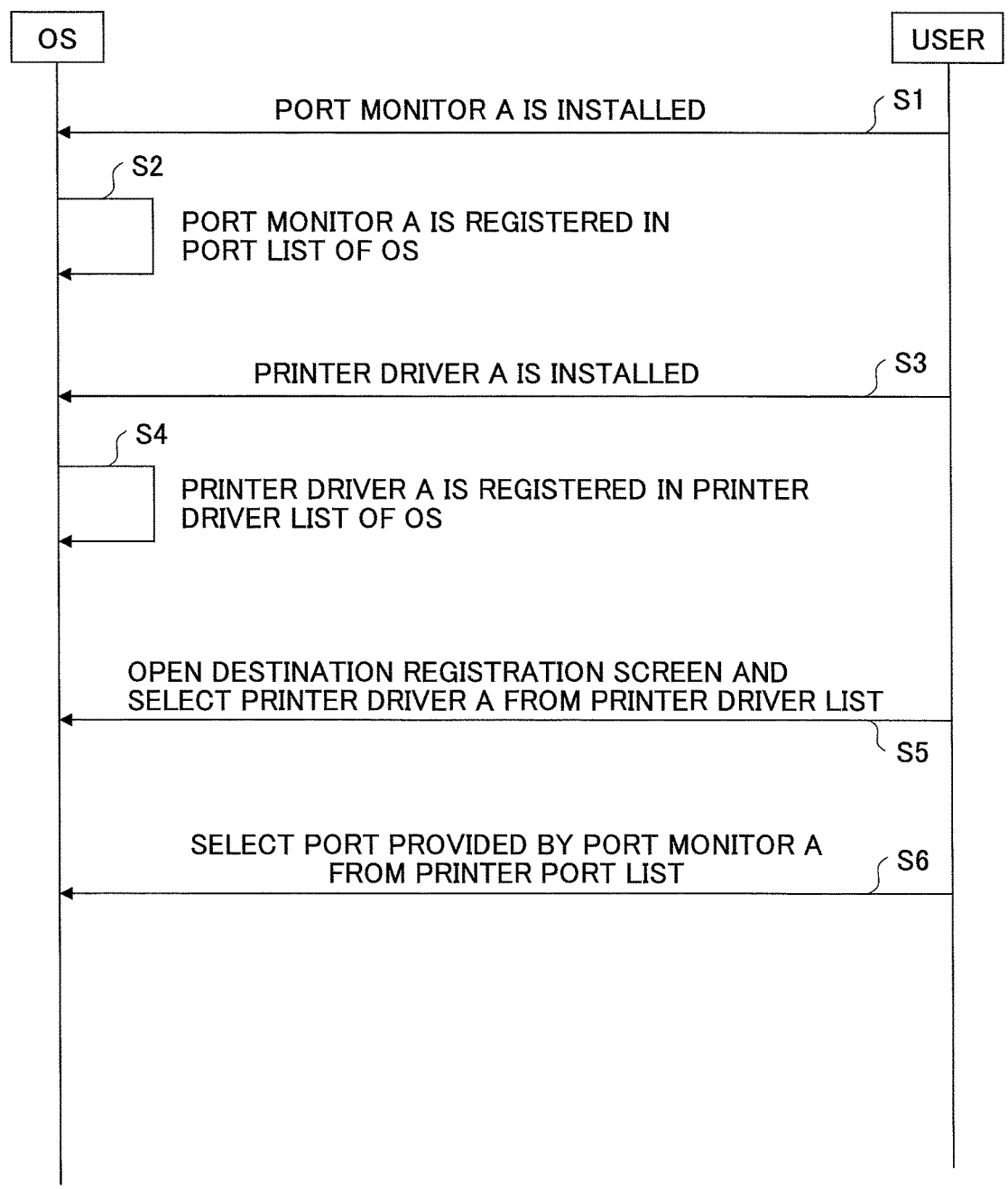
FIG. 13 is a sequence diagram illustrating an example of a destination registration process.

FIG. 13 is a sequence diagram illustrating an example of a destination registration process.

In step S1, a port monitor A (which will be the port monitor 35) is installed in the client terminal 11 in order to add a port of the print service providing apparatus 22 as a usable port to the client terminal 11. By the port monitor A, the client terminal 11 becomes capable of registering the port of the print service providing apparatus 22 as the usable port. In step S2, the port provided by the port monitor A is registered in a port list such as a printer port list of an OS.

In step S3, a printer driver A is installed in the client terminal 11 in order to add a printer driver A "cloud print" of the print service providing apparatus 22 as the usable printer driver. By installing the printer driver A, the client terminal 11 becomes capable of registering the printer driver A of the print service providing apparatus 22 as the usable printer driver. In step S4, the printer driver A is registered in a printer driver list of the OS.

Figure 14:
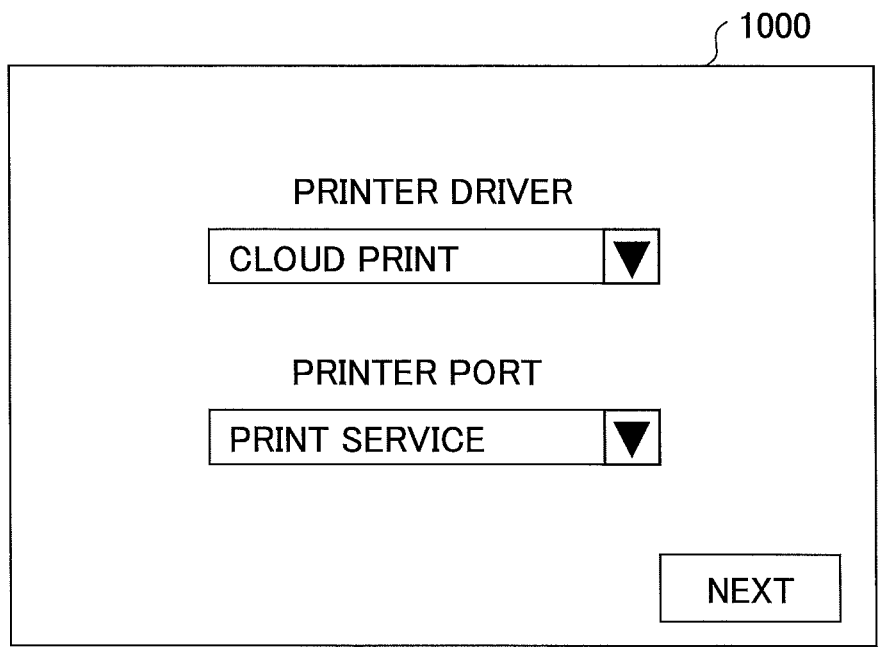
FIG. 14 is an image diagram illustrating an example of a destination registration screen.

In step S5, when registering the print service providing apparatus 22 as a destination to send the print data, a user operates the client terminal 11 to open a destination registration screen 1000 as illustrated in FIG. 14 and select the printer driver A "cloud print" from the printer driver list of the destination registration screen 1000.

Further, in step S6, the user operates the client terminal 11 to select a port "print service" of the print service providing apparatus 22 provided by the port monitor A from the printer port list of the destination registration screen 1000.

Figure 15:
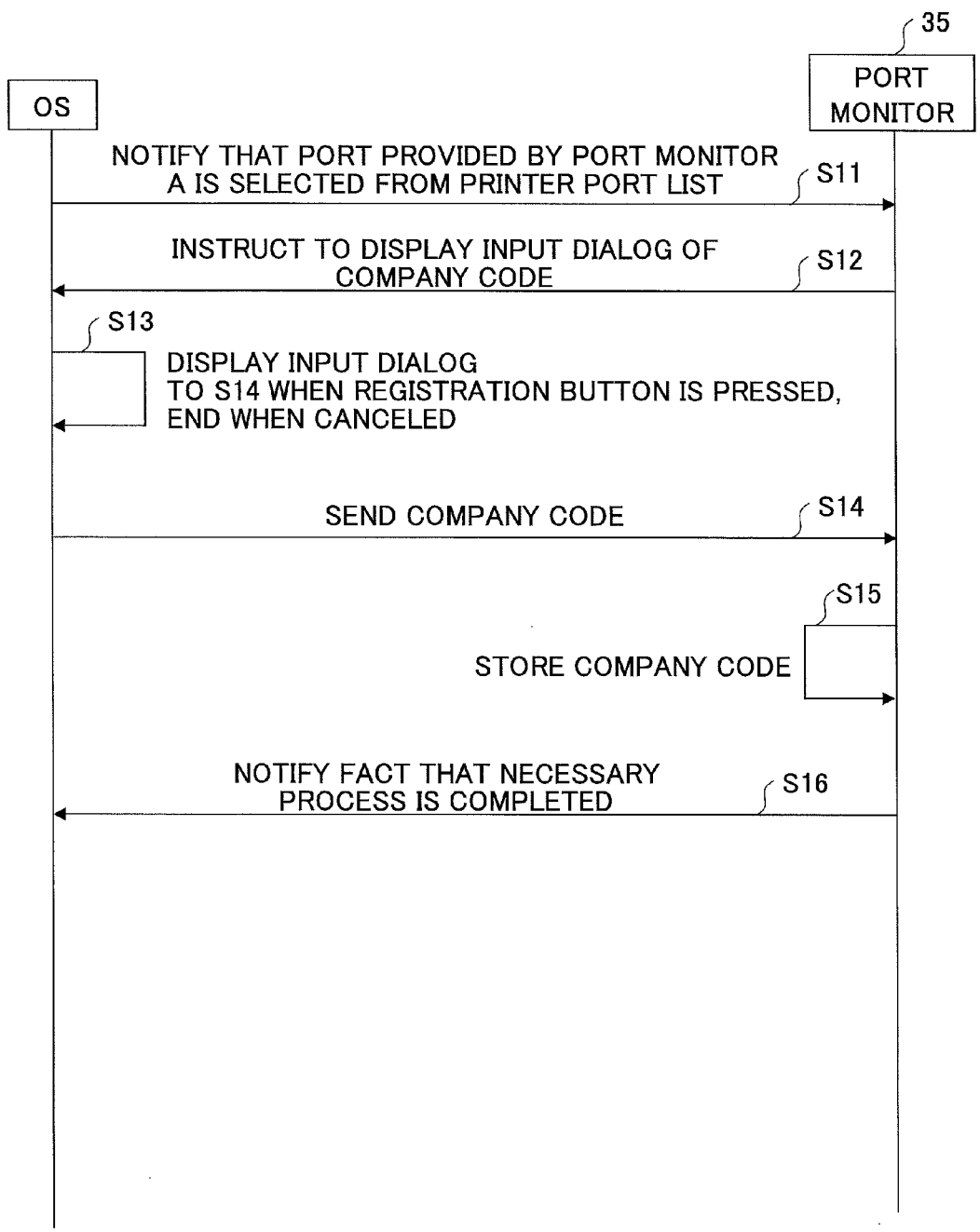
FIG. 15 is a sequence diagram illustrating an example of a company code inputting process.

When the printer driver A "cloud print" and the port "print service" of the print service providing apparatus 22 provided by the port monitor A are selected by the user, the OS and the port monitor 35 (see FIG. 4) perform the process as illustrated in a sequence diagram of FIG. 15.

FIG. 15 is a sequence diagram illustrating an example of a company code inputting process.

In step S11, the OS notifies the port monitor 35 that the port provided by the port monitor 35 (port monitor A) is selected from the printer port list.

Figure 16:
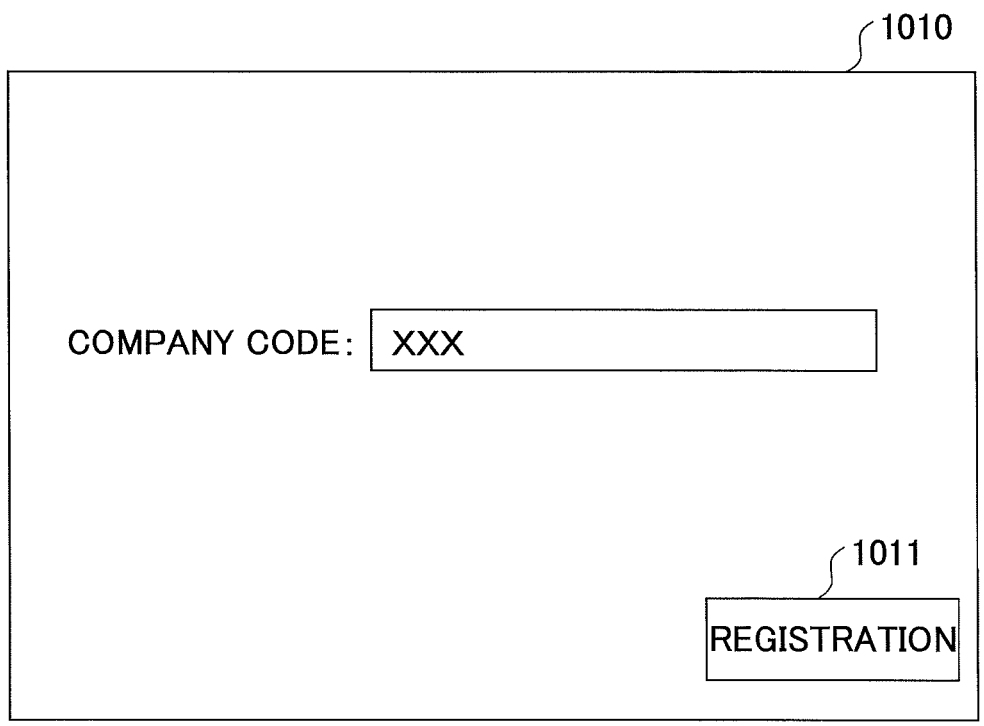
FIG. 16 is an image diagram illustrating an example of an input dialog of a company code.

In step S12, the destination registration unit 43 of the port monitor 35 instructs the OS to display an input dialog 1010 as illustrated in FIG. 16. FIG. 16 is an image diagram illustrating an example the input dialog 1010 of the company code. In step S13, the OS displays the input dialog 1010. The user inputs the company code in the input dialog 1010 and presses a registration button 1011.

When the registration button 1011 is pressed after the company code is input, the OS sends the company code input in the input dialog 1010 to the destination registration unit 43 of the port monitor 35, in step S14. In step S15, the destination registration unit 43 of the port monitor 35 stores the received company code in the destination setting storing unit 36 in association with the port "print service" provided by the port monitor 35 (port monitor A). In step S16, the port monitor 35 notifies the fact that a necessary process is completed to the OS and the company code inputting process is finished.

(Output Data Inputting Process)

Figure 17:
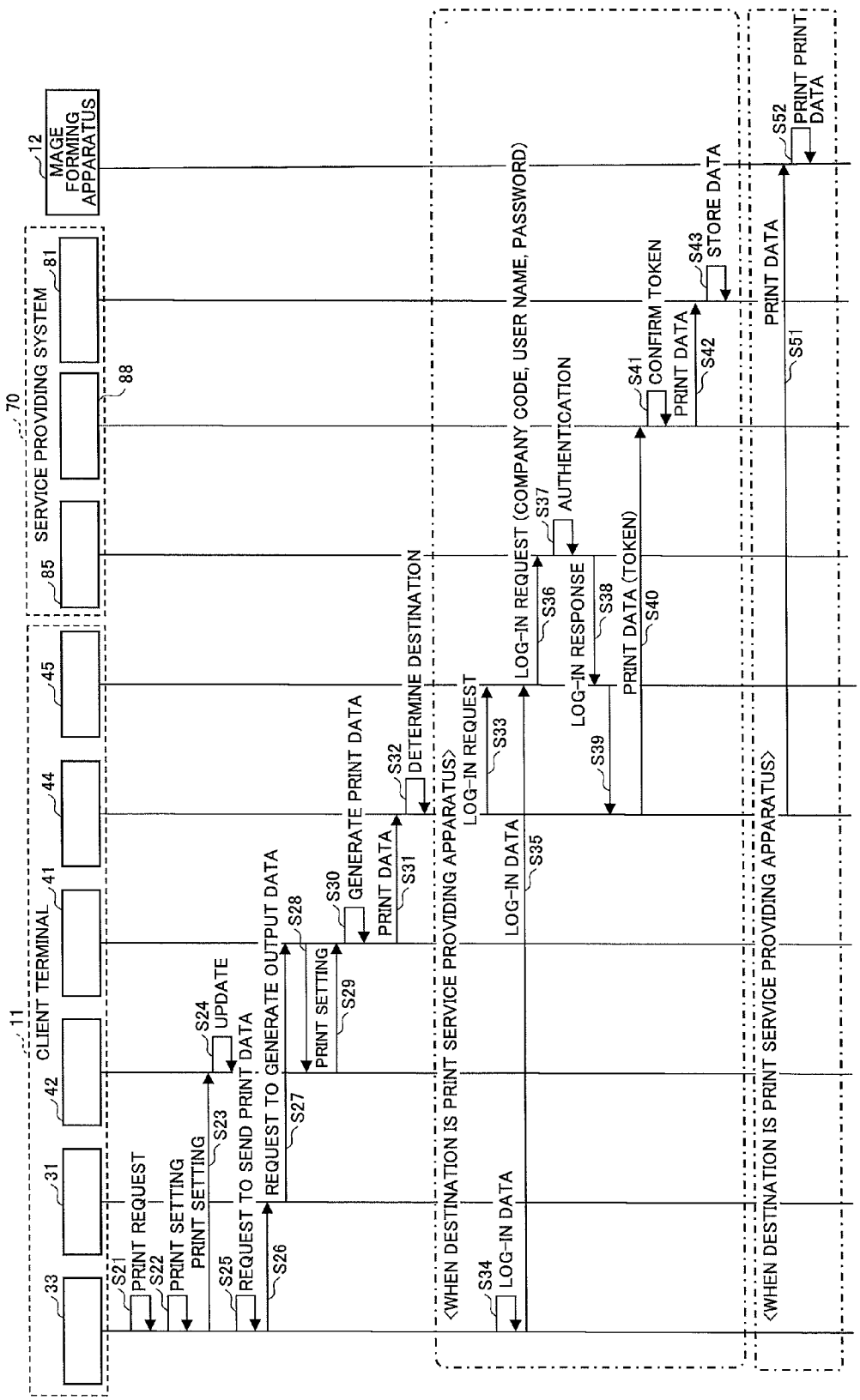
FIG. 17 is a sequence diagram illustrating an example of an output data inputting process.

An example of a process to input print data from the client terminal 11 is as illustrated in FIG. 17, for example. FIG. 17 is a sequence diagram illustrating an example of an output data inputting process.

In step S21, the input accepting unit 33 of the client terminal 11 accepts a print request to the application 31 having the printing function by a user operation. In step S22, the client terminal 11 accepts a print setting, which is an example of an output setting, by a user operation. The print setting includes a setting of a destination to send the print data. For example, the user sets the destination to send the print data from a print setting screen of the application 31 having the printing function.

In step S23, the output setting unit 42 receives the print setting from the input accepting unit 33. In step S24, the output setting unit 42 updates a print setting held by the output setting unit 42 by the received print setting.

In step S25, the client terminal 11 accepts a request to send print data by a user operation. In step S26, the input accepting unit 33 of the client terminal 11 requests the application 31 to send data (application data) to be printed. In step S27, the application 31 requests the output data generating unit 41 to generate output data by sending application data.

In step S28, the output data generating unit 41 requests the output setting unit 42 to send the print setting. In step S29, the output data generating unit 41 receives the print setting from the output setting unit 42. In step S30, the output data generating unit 41 generates print data as an example of the output data from the application data based on the print setting received from the output setting unit 42.

In step S31, the output data sending control unit 44 receives the print data generated by the output data generating unit 41. In step S32, the output data sending control unit 44 determines the destination (setting of the destination), as will be explained later, based on the destination to send the print data included in the print setting and the setting of the destination stored in the destination setting storing unit 36.

When the destination to send the print data is the print service providing apparatus 22, the output data sending control unit 44 determines that the print service providing apparatus 22 is access controlled and requests the log-in requesting unit 45 to perform a log-in operation in step S33. The log-in requesting unit 45 displays a log-in data input screen, which will be explained later, for having the user input log-in data (authentication information) including user name, a password or the like.

In step S34, the input accepting unit 33 of the client terminal 11 accepts an input of the log-in data from the user. In step S35, the log-in requesting unit 45 receives the log-in data from the input accepting unit 33. In step S36, the log-in requesting unit 45 requests the authentication process unit 85 of the service providing system 70 to log-in, as will be explained later. At this time, the company code, the user name, the password or the like are sent to the authentication process unit 85.

In step S37, the authentication process unit 85 of the service providing system 70 performs an authentication, as will be explained later. In step S38, the authentication process unit 85 sends an authentication result as a log-in response to the log-in requesting unit 45 of the client terminal 11. When the authentication result is a success (authentication is OK), the authentication process unit 85 sends a token (cookie) with the authentication result to the log-in requesting unit 45. The service providing system 70 stores the token in association with the user name and the company code of the authenticated user.

In step S39, the log-in requesting unit 45 sends the authentication result as the log-in response to the output data sending control unit 44. When the authentication result is a success, the log-in requesting unit 45 sends the token to the output data sending control unit 44 as well.

Here, in the following, it is assumed that the authentication result is a success (authentication is OK). In step S40, the output data sending control unit 44 sends the token and the print data to the service providing system 70 to request inputting of the print data.

In step S41, the session control unit 88 of the service providing system 70 determines whether a token that is the same as that received in step S40 exists among the stored tokens. When the token that is the same as that received in step S40 exists, the session control unit 88 sends the user name and the company code that are stored in association with the respective token and the print data to the print service application 81 in step S42.

In step S43, the print service application 81 adds output data ID to the print data and stores in the data storage 95. The print service application 81 stores the output data management data of the print data to which the output data ID is added in the output data management data storing unit 304.

On the other hand, when the destination to send the print data is the image forming apparatus 12 in step S32, the process proceeds to step S51. In step S51, the output data sending control unit 44 sends the print data to the image forming apparatus 12. In step S52, the image forming apparatus 12 prints the received print data.

Figure 18:
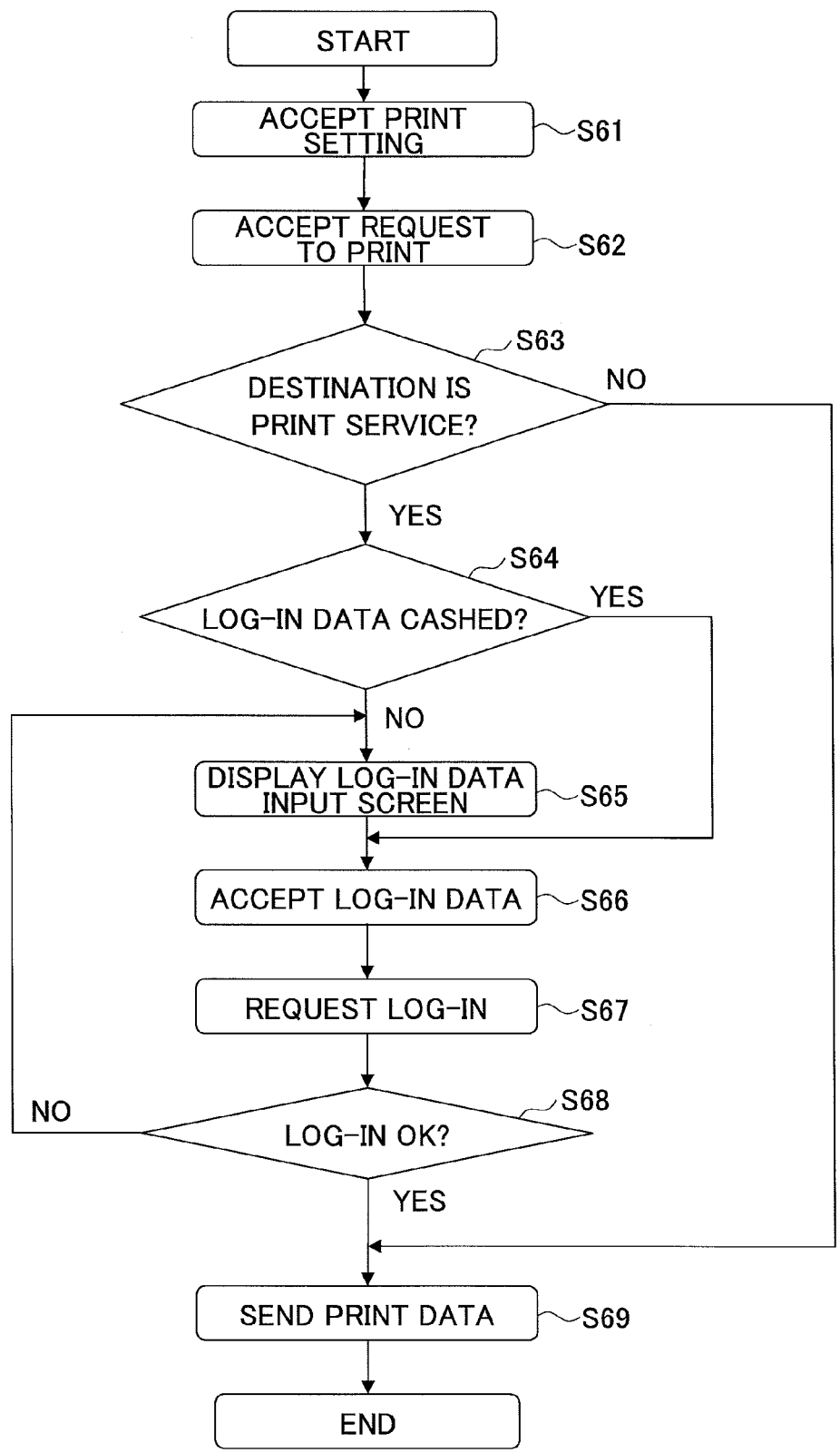
FIG. 18 is a flowchart illustrating an example of a process of sending print data.

The client terminal 11 sends the print data as illustrated in FIG. 18. FIG. 18 is a flowchart illustrating an example of a process of sending the print data.

In step S61, the client terminal 11 accepts the print setting, which is an example of the output setting, by the user operation. In step S62, the client terminal 11 accepts the request to send the print data (a request to print) by the user operation.

In step S63, the client terminal 11 determines whether the destination to send the print data (to which the print data is to be sent) is the port "print service" of the print service providing apparatus 22. When the destination to send the print data is not the port "print service" of the print service providing apparatus 22 (NO in step S63), the process proceeds to step S69 and the client terminal 11 sends the print data to the image forming apparatus 12.

On the other hand, when the destination to send the print data is the port "print service" of the print service providing apparatus 22 (YES in step S63), the process proceeds to step S64. In step S64, the client terminal 11 determines whether there exists cached log-in data. When the cached log-in data does not exist (NO in step S64), the client terminal 11 displays a log-in data input screen 1020 as illustrated in FIG. 19 in step S65.

FIG. 19 is an image diagram illustrating an example of the log-in data input screen 1020. The log-in data input screen 1020 is provided for the user to input log-in data (authentication information) including the user name, the password or the like. For the company code, the company code stored in the destination setting storing unit 36 in association with the "print service" may be used. In step S66, the client terminal 11 accepts an input of the log-in data using the log-in data input screen 1020 from the user.

When the cached log-in data exists in step S64, the client terminal 11 uses the cached log-in data without displaying the log-in data input screen 1020.

In step S67, the client terminal 11 sends the log-in data to the service providing system 70 to request log-in. The service providing system 70 performs an authentication, as will be explained later, and sends an authentication result to the client terminal 11.

In step S68, the client terminal 11 receives the authentication result from the service providing system 70. When the authentication result indicates failure (NO in step S68), the process returns back to step S65 and the client terminal 11 displays the log-in data input screen 1020 as illustrated in FIG. 19. On the other hand, when the authentication result indicates success (YES in step S68), the client terminal 11 sends the token and the print data to the service providing system 70.

Figure 20:
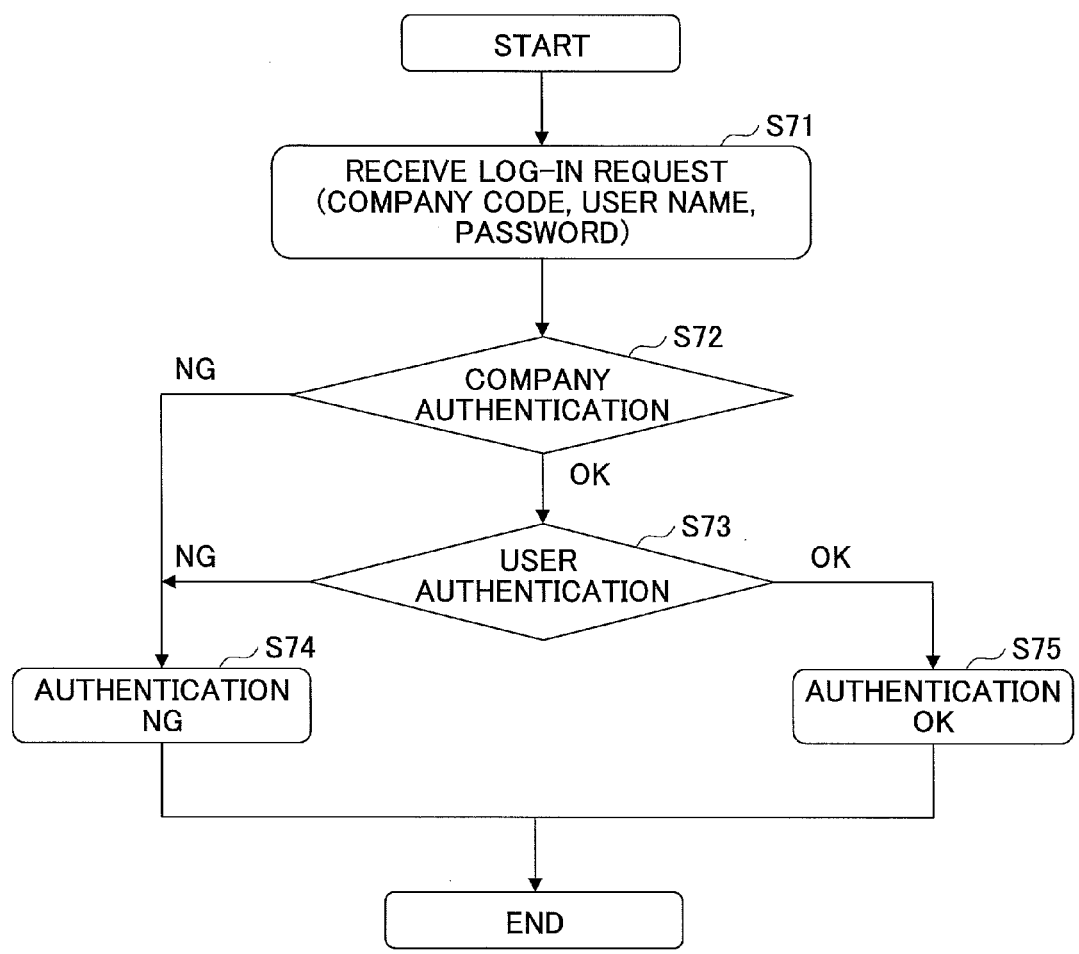
FIG. 20 is a flowchart illustrating an example of an operation of a service providing system when receiving a log-in request from a client terminal.

FIG. 20 is a flowchart illustrating an example of an operation of the service providing system 70 when receiving the log-in request from the client terminal 11.

In step S71, the authentication process unit 85 of the service providing system 70 receives the log-in request including the company code, the user name and the password as the log-in data from the client terminal 11.

In step S72, the authentication process unit 85 performs a company authentication that determines whether a company code that is the same as that included in the log-in data exists in the company management data stored in the company management data storing unit 91 as illustrated in FIG. 8. When the company code that is the same as that included in the log-in data exists in the company management data illustrated in FIG. 8, the authentication process unit 85 determines that the company authentication is a success (authentication OK) and the process proceeds to step S73.

In step S73, the authentication process unit 85 performs a user authentication that determines whether user name and a password that are the same as those included in the log-in data exist in the user management data corresponding to the authenticated company code among the user management data stored in the user management data storing unit 92 as illustrated in FIG. 9.

When the user name and the password that are the same as those included in the log-in data exist, the authentication process unit 85 determines that the user authentication is a success (authentication OK) and the process proceeds to step S75. In step S75, the authentication process unit 85 determines the authentication result in response to the log-in request from the client terminal 11 as a success (authentication OK).

When the company code that is the same as that included in the log-in data does not exist in step S71, the authentication process unit 85 determines the authentication result in response to the log-in request from the client terminal 11 as a failure (authentication NG) in step S74.

Similarly, in step S73, when the user name and the password that are the same as those included in the log-in data do not exist, the authentication process unit 85 determines the authentication result in response to the log-in request from the client terminal 11 as a failure (authentication NG) in step S74.

(Data List Obtaining Process)

Figure 21:
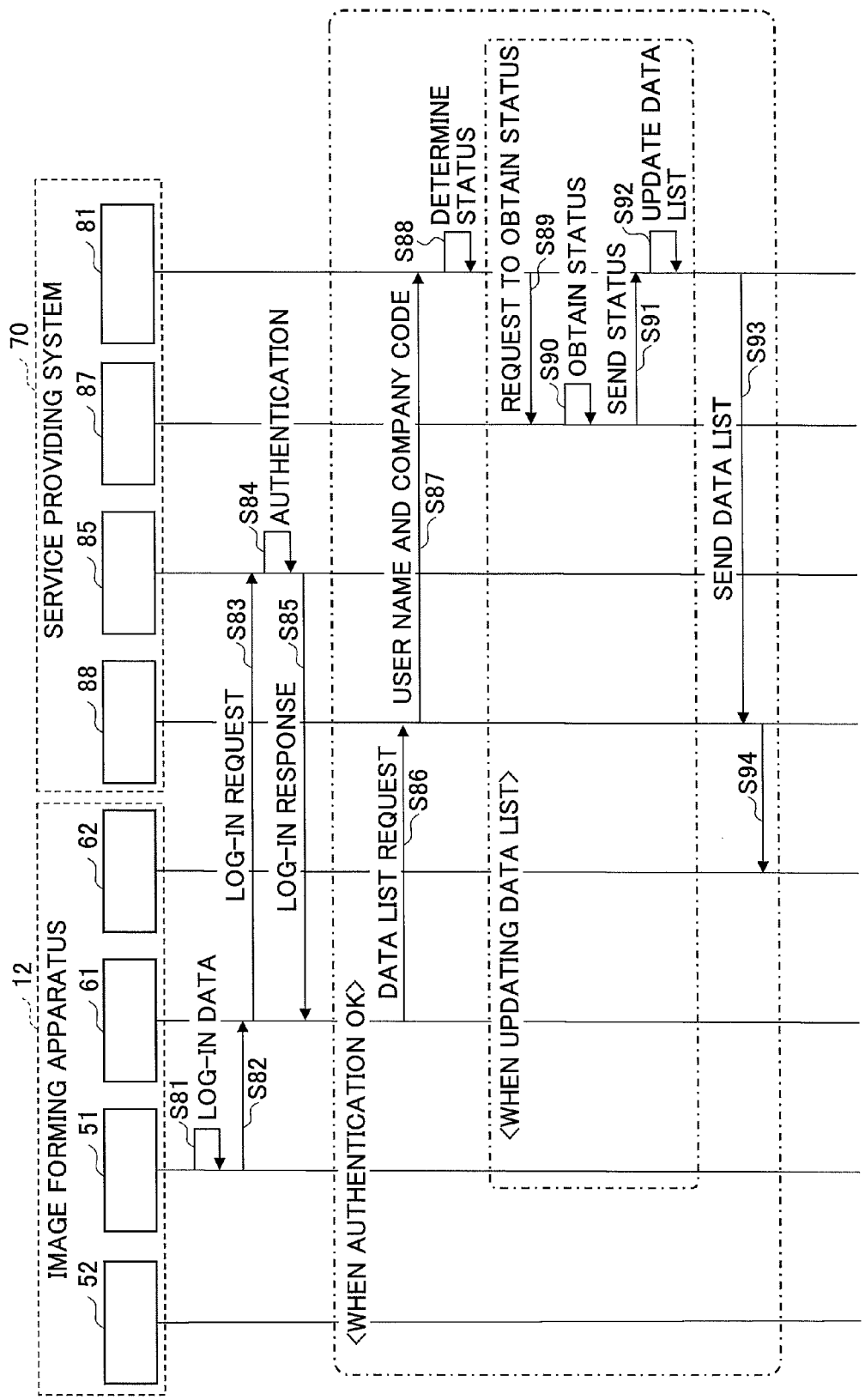
FIG. 21 is a sequence diagram illustrating an example of a data list obtaining process.

FIG. 21 is a sequence diagram illustrating an example of a data list obtaining process in which the data list is obtained from the service providing system 70. In this case, the image forming apparatus 12 requests the service providing system 70 to send the data list. Processes in the sequence diagram illustrated in FIG. 21 are performed after the image forming apparatus 12 accepts a request to obtain the data list from the user.

In step S81, the input accepting unit 51 of the image forming apparatus 12 accepts an input of the log-in data from the user. In step S82, the log-in requesting unit 61 receives the input log-in data from the input accepting unit 51. Then, in step S83, the log-in requesting unit 61 sends the log-in request to the authentication process unit 85 of the service providing system 70, as will be explained later.

In step S84, the authentication process unit 85 of the service providing system 70 performs an authentication, as will be explained later. In step S85, the authentication process unit 85 sends an authentication result as a log-in response to the log-in requesting unit 45 of the image forming apparatus 12.

When the authentication result is a success (authentication OK), the authentication process unit 85 sends a token (cookie) with the authentication result to the log-in requesting unit 61. The service providing system 70 stores the token in association with the user name and the company code of the authenticated user.

Here, in the following, it is assumed that the authentication result is a success (authentication is OK).

In step S86, the log-in requesting unit 61 sends the token and a request to obtain the data list to the service providing system 70. The session control unit 88 of the service providing system 70 performs a process similar to step S41 illustrated in FIG. 17 and determines whether a token that is the same as that received in step S86 exists among the stored tokens.

When the token that is the same as that received in step S86 exists, the session control unit 88 sends the user name and the company code that are stored in association with the respective token to the print service application 81 in step S87.

In step S88, the print service application 81 refers to the output data management data stored in the output data management data storing unit 304 illustrated in FIG. 12A and FIG. 12B, and confirms the conversion status of the output data management data of the output data with which the received user name and the company code are associated. When there is the conversion status "being converted" for the output data management data of the output data with which the received user name and the company code are associated, the print service application 61 determines to update the data list because there is a possibility that the status has been changed.

Here, it is assumed that the data list is to be updated here, and the explanation is continued. In step S89, the print service application 81 sends the job ID corresponding to the received user name and the company code in the output data management data to the data process unit 87 and requests to obtain the conversion status of the data management data corresponding to the job ID. In step S90, the data process unit 87 refers to the data management data stored in the data management data storing unit 94 illustrated in FIG. 11 and obtains the conversion status of the data management data corresponding to the received job ID.

In step S91, the data process unit 87 sends the conversion status of the data management data corresponding to the received job ID to the print service application 81. In step S92, the print service application 81 updates the output data management data based on the conversion status of the data management data corresponding to the job ID received from the data process unit 87. The data list is updated, as a result.

Then, in steps S93 and S94, the print service application 81 sends the data list based on the updated output data management data to the data process requesting unit 62 of the image forming apparatus 12 via the session control unit 88. Here, the print service application 81 includes a job whose conversion status of the data management data is "completed" in the data list.

When it is determined that the data list is not to be updated in step S88, the print service application 81 sends the data list based on the current output data management data, without updating the output data management data, to the image forming apparatus 12.

With this configuration, the image forming apparatus 12 is capable of displaying the data list of the print data for which the conversion process is completed, based on the conversion status that varies in accordance with the process by the data process unit 87.

Figure 22:
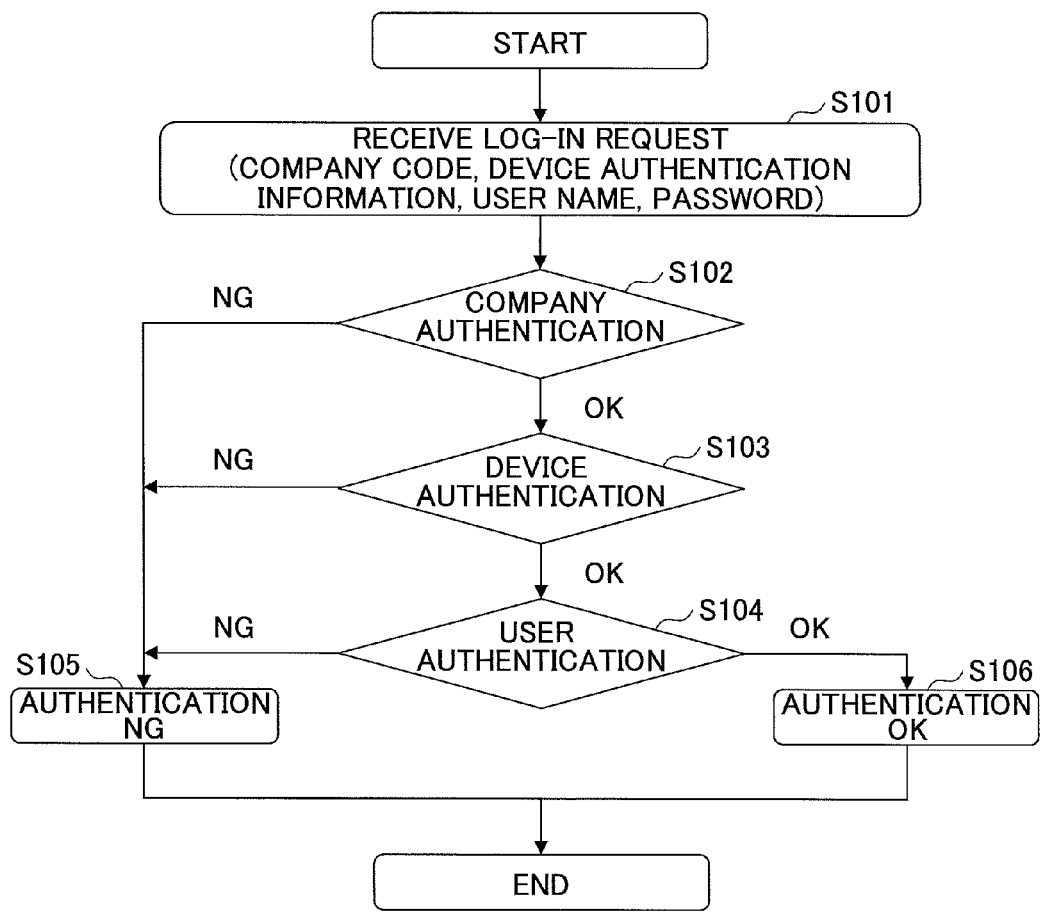
FIG. 22 is a flowchart illustrating an example of an operation of the service providing system when receiving a log-in request from the image forming apparatus.

FIG. 22 is a flowchart illustrating an example of an operation of the service providing system 70 when receiving the log-in request from the image forming apparatus 12. The flowchart illustrated in FIG. 22 is similar to that illustrated in FIG. 20 but a device authentication of step S103 is added.

In step S101, the authentication process unit 85 of the service providing system 70 receives the log-in request including the company code, the device authentication information, the user name and the password as the log-in data from the image forming apparatus 12.

In step S102, the authentication process unit 85 performs the company authentication that determines whether a company code that is the same as that included in the log-in data exists in the company management data stored in the company management data storing unit 91 illustrated in FIG. 8. When the company code that is the same as that included in the log-in data exists in the company management data illustrated in FIG. 8, the authentication process unit 85 determines that the company authentication is a success (authentication OK) and the process proceeds to step S103.

In step S103, the authentication process unit 85 performs a device authentication that determines whether device authentication information that is the same as that included in the log-in data exists in the device management data corresponding to the authenticated company code among the device management data stored in the device management data storing unit 93 illustrated in FIG. 10. When the device authentication information that is the same as that included in the log-in data exists, the authentication process unit 85 determines that the device authentication is a success (authentication OK) and the process proceeds to step S104.

In step S104, the authentication process unit 85 performs the user authentication that determines whether user name and a password that are the same as those included in the log-in data exist in the user management data corresponding to the authenticated company code among the user management data stored in the user management data storing unit 92 illustrated in FIG. 9.

When the user name and the password that are the same as those included in the log-in data exist, the authentication process unit 85 determines that the user authentication is a success (authentication OK) and the process proceeds to step S106. In step S106, the authentication process unit 85 determines the authentication result in response to the log-in request from the image forming apparatus 12 as a success (authentication OK).

When the company code that is the same as that included in the log-in data does not exist in step S102, the authentication process unit 85 determines the authentication result in response to the log-in request from the image forming apparatus 12 as a failure (authentication NG) in step S105.

Similarly, in step S103, when the device authentication information that is the same as that included in the log-in data does not exist in step S103, the authentication process unit 85 determines that the authentication result in response to the log-in request from the image forming apparatus 12 as a failure (authentication NG) in step S105.

Similarly, when the user name and the password that are the same as those included in the log-in data do not exist in step S104, the authentication process unit 85 determines the authentication result in response to the log-in request from the image forming apparatus 12 as a failure (authentication NG) in step S105.

Figure 23:
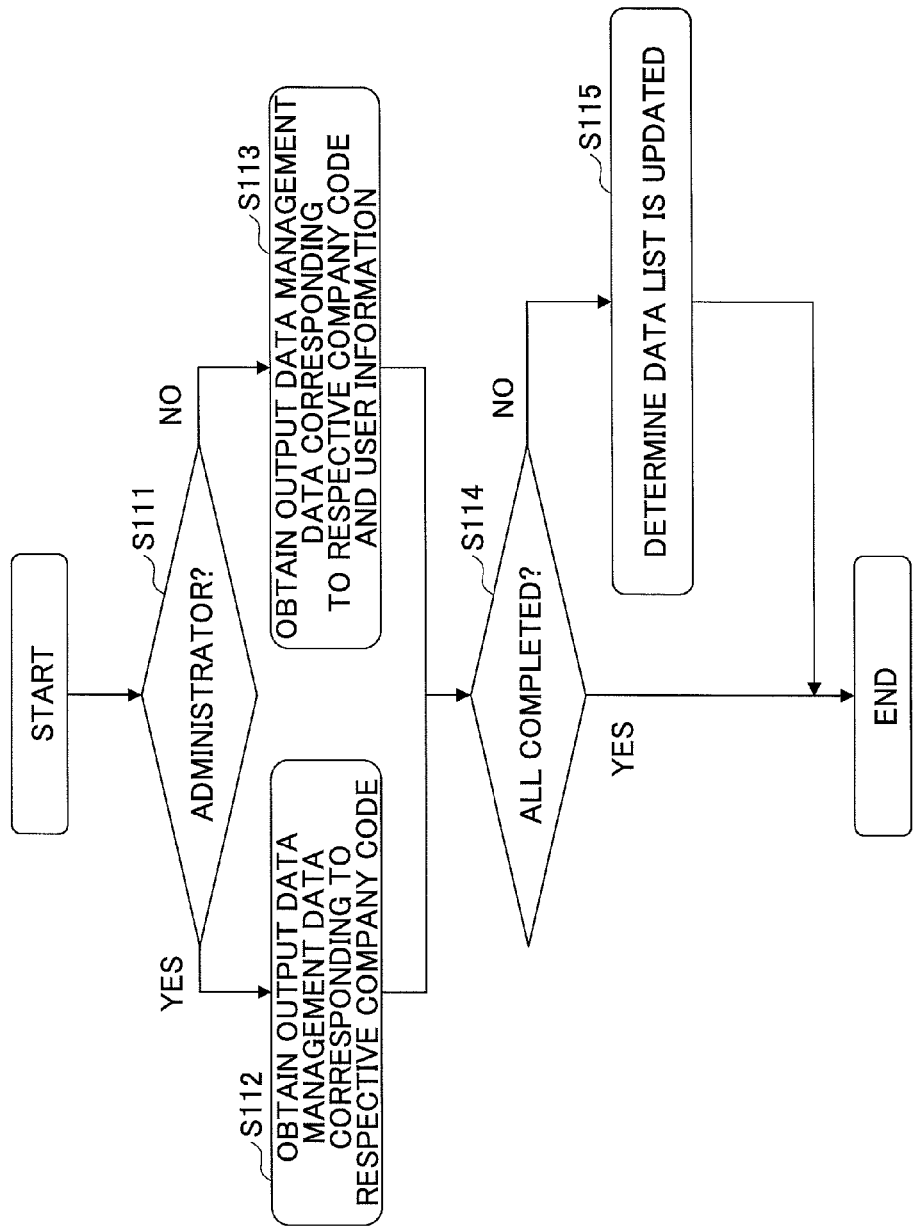
FIG. 23 is a flowchart illustrating an example of a process of determining conversion statuses.

The process of step S88 illustrated in FIG. 21 in which the conversion status is determined may be performed in accordance with a flowchart illustrated in FIG. 23.

In step S111, the print service application 81 refers to the user management data stored in the user management data storing unit 92 as illustrated in FIG. 9 and determines whether a role of the log-in user who requested to obtain the data list is an administrator based on the user management data corresponding to the received user name and the company code.

When the role of the log-in user is the administrator (YES in step S111), the print service application 81 refers to the output data management data stored in the output data management data storing unit 304 illustrated in FIG. 12A and FIG. 12B in step S112 and obtains the conversion status of the data management data corresponding to the received company code. On the other hand, when the role of the log-in user is an ordinary user (NO in step S111), the print service application 81 refers to the output data management data stored in the output data management data storing unit 304 illustrated in FIG. 12A and FIG. 12B in step S113 and obtains the conversion status of the data management data corresponding to the received company code and also the user name (user information).

Then, the process proceeds to step S114. In step S114, the print service application 81 determines whether the conversion statuses of the data management data obtained in step S112 or S113 are all "completed". When the conversion statuses obtained in step S112 or S113 are all "completed" (YES in step S114), as there is no possibility that the conversion statuses are changed, it is determined that the data list is not updated. Then, the process is finished.

On the other hand, when not all of the conversion statuses confirmed in step S112 or S113 are "completed" (NO in step S114), as there is a possibility that the conversion statuses are changed, it is determined that the data list is updated (step S115. Then, the process is finished.

(Data Outputting Process and Data Deleting Process)

Figure 24:
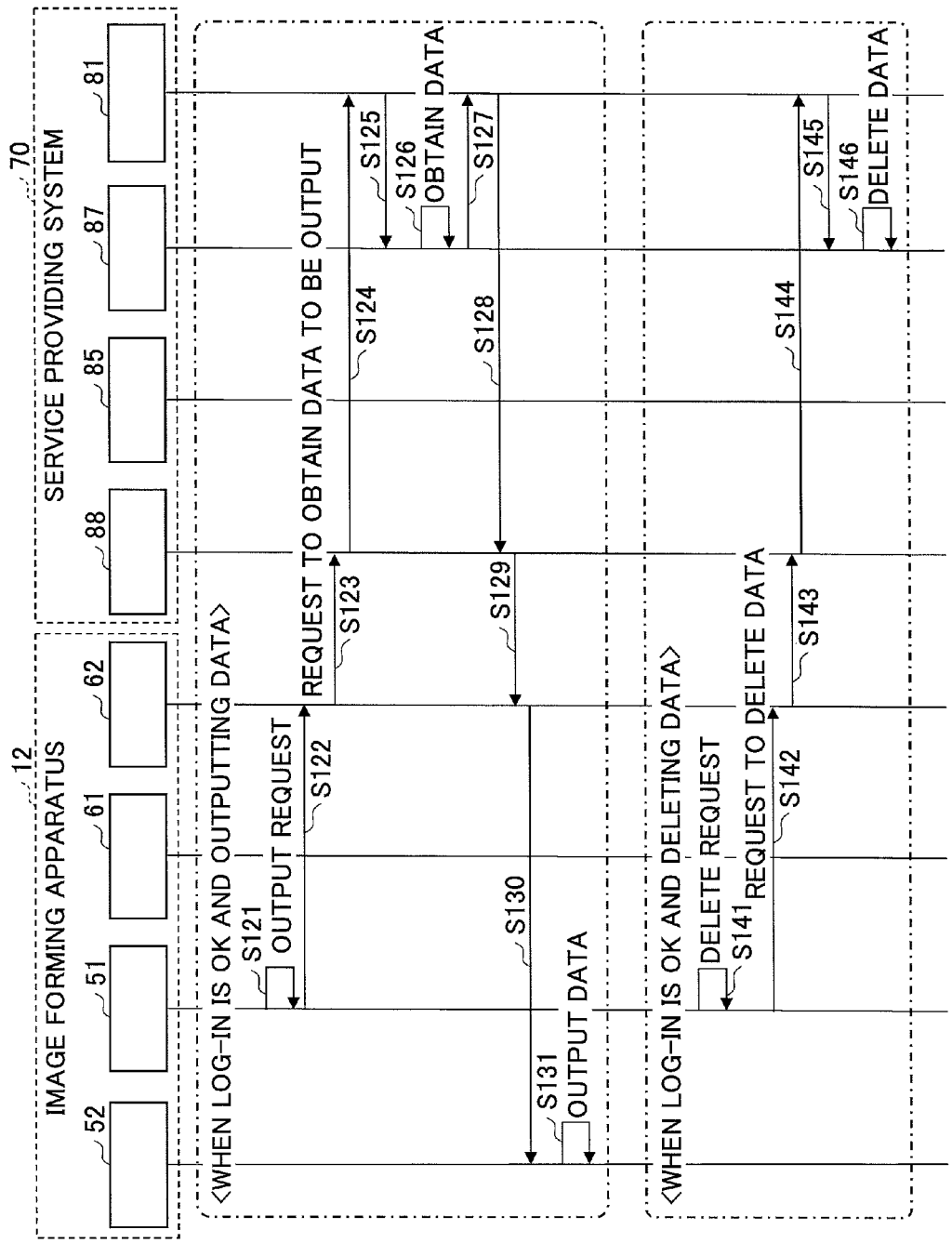
FIG. 24 is a sequence diagram illustrating an example of a data outputting process and a data deleting process.

FIG. 24 is a sequence diagram illustrating an example of a data outputting process in which data is output from the image forming apparatus 12 and a data deleting process in which data is deleted from the service providing system 70. Processes of the sequence diagram illustrated in FIG. 24 are performed, for example, after the processes of the sequence diagram illustrated in FIG. 21 are performed.

Processes of steps S121 to S131 illustrate a case when the authentication result is a success and the print data is output from the image forming apparatus 12. In step S121, the input accepting unit 51 of the image forming apparatus 12 accepts an output request of the print data from the user.

In step S122, the input accepting unit 51 requests the data process requesting unit 62 to obtain print data (data to be output) for which the output request is accepted. In step S123, the data process requesting unit 62 sends the token and a request to obtain data to be output to the service providing system 70.

The session control unit 88 of the service providing system 70 determines whether a token that is the same as that received in step S123 exists in the stored tokens. When the token that is the same as that received in step S123 exists in the stored tokens, the session control unit 88 sends the user name and the company code stored in association with the respective token to the print service application 81, in step S124.

In step S125, the print service application 81 sends the job ID of the output data management data corresponding to the received user name and the company code to the data process unit 87 and requests to obtain the print data corresponding to the job ID. In step S126, the data process unit 87 refers to the data management data stored in the data management data storing unit 94 illustrated in FIG. 11 and obtains the print data corresponding to the received job ID. In step S127, the data process unit 87 sends the print data corresponding to the received job ID to the print service application 81.

In steps S128 and S129, the print service application 81 sends the received print data to the data process requesting unit 62 of the image forming apparatus 12 via the session control unit 88. In step S130, the data process requesting unit 62 sends the received print data to the output unit 52. In step S131, the output unit 52 prints the received print data.

Processes of steps S141 to S144 illustrate a case when the authentication is a success and the print data is deleted from the service providing system 70. In step S141, the input accepting unit 51 of the image forming apparatus 12 accepts a delete request of the print data from the user.

In step S142, the input accepting unit 51 requests the data process requesting unit 62 to delete the print data. Upon receiving the request to delete the print data from the input accepting unit 51, the data process requesting unit 62 sends the token and a request to delete the print data to the service providing system 70.

The session control unit 88 of the service providing system 70 determines whether a token that is the same as that received in step S143 exists in the stored tokens.

When the token that is the same as that received in step S143 exists in the stored tokens, the session control unit 88 sends the user name and the company code stored in association with the respective token to the print service application 81, in step S144.

In step S145, the print service application 81 sends the received user name and the company code to the data process unit 87, and requests to delete the print data. In step S146, the data process unit 87 deletes the print data based on the request to delete the print data.

In the system 1 of the first embodiment, the client terminal 11 sends the print data to the image forming apparatus 12 when the destination to send the print data is the image forming apparatus 12, and sends the print data to the print service providing apparatus 22, which is on the network N2 having an access control function, when the destination to send the print data is the print service providing apparatus 22 after performing a log-in operation to the print service providing apparatus 22.

According to the system 1 of the first embodiment, a common user interface can be provided to a user for a case when the print data is sent to the image forming apparatus 12 to be printed and a case when the print data is sent to the print service providing apparatus 22 so that the print data is printed using the print service provided by the print service providing apparatus 22, from the client terminal 11.

Second Embodiment

In the second embodiment, an output log is sent from the client terminal 11 to the service providing system 70 and is stored. Components that are the same as those in the first embodiment are given the same reference numerals, and explanations are not repeated. The system structure and the hardware structure of the second embodiment are the same as those of the first embodiment.

(Software Structure)

Figure 25:
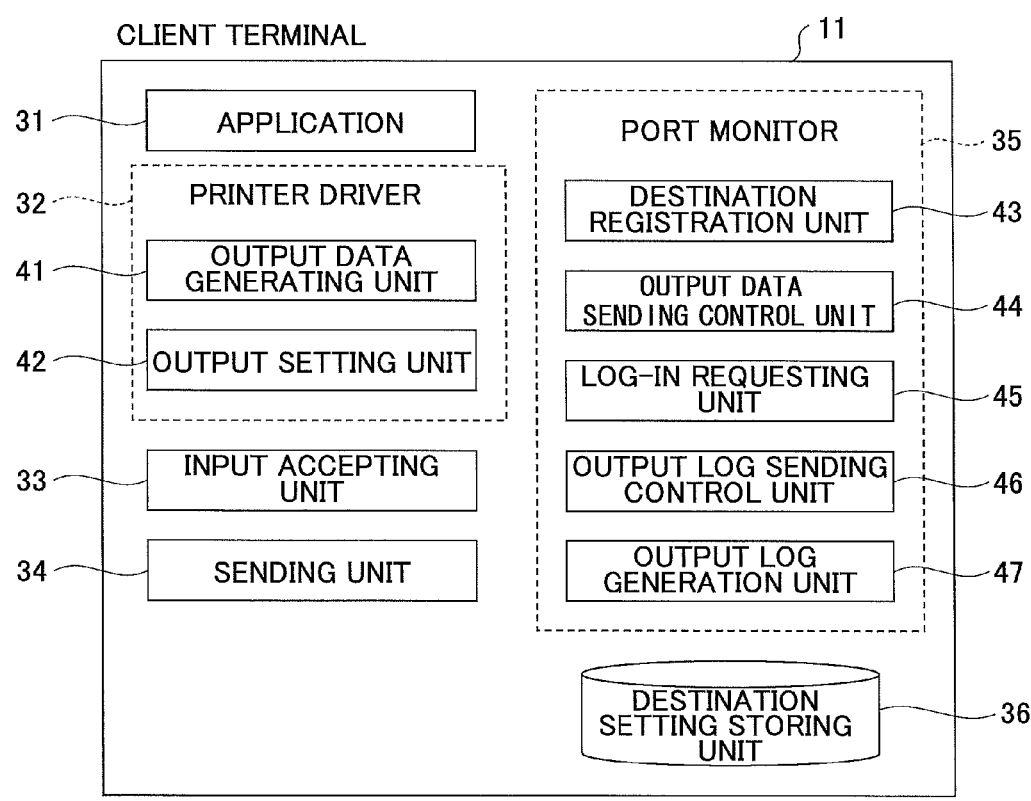
FIG. 25 is a functional block diagram illustrating an example of the client terminal of another embodiment.

For a software structure, the client terminal 11 and the service providing system 70 are different from those of the first embodiment. The client terminal 11 of the second embodiment includes components as illustrated in FIG. 25, for example. FIG. 25 is a functional block diagram illustrating an example of the client terminal 11 of the second embodiment.

The client terminal 11 illustrated in FIG. 25 further includes an output log sending control unit 46 and an output log generation unit 47 (an example of a log generation unit) in addition to the components of the client terminal 11 illustrated in FIG. 4.

The output log generation unit 47 generates an output log to be sent to the service providing system 70. The output log sending control unit 46 controls sending of the output log to the service providing system 70.

Figure 26:
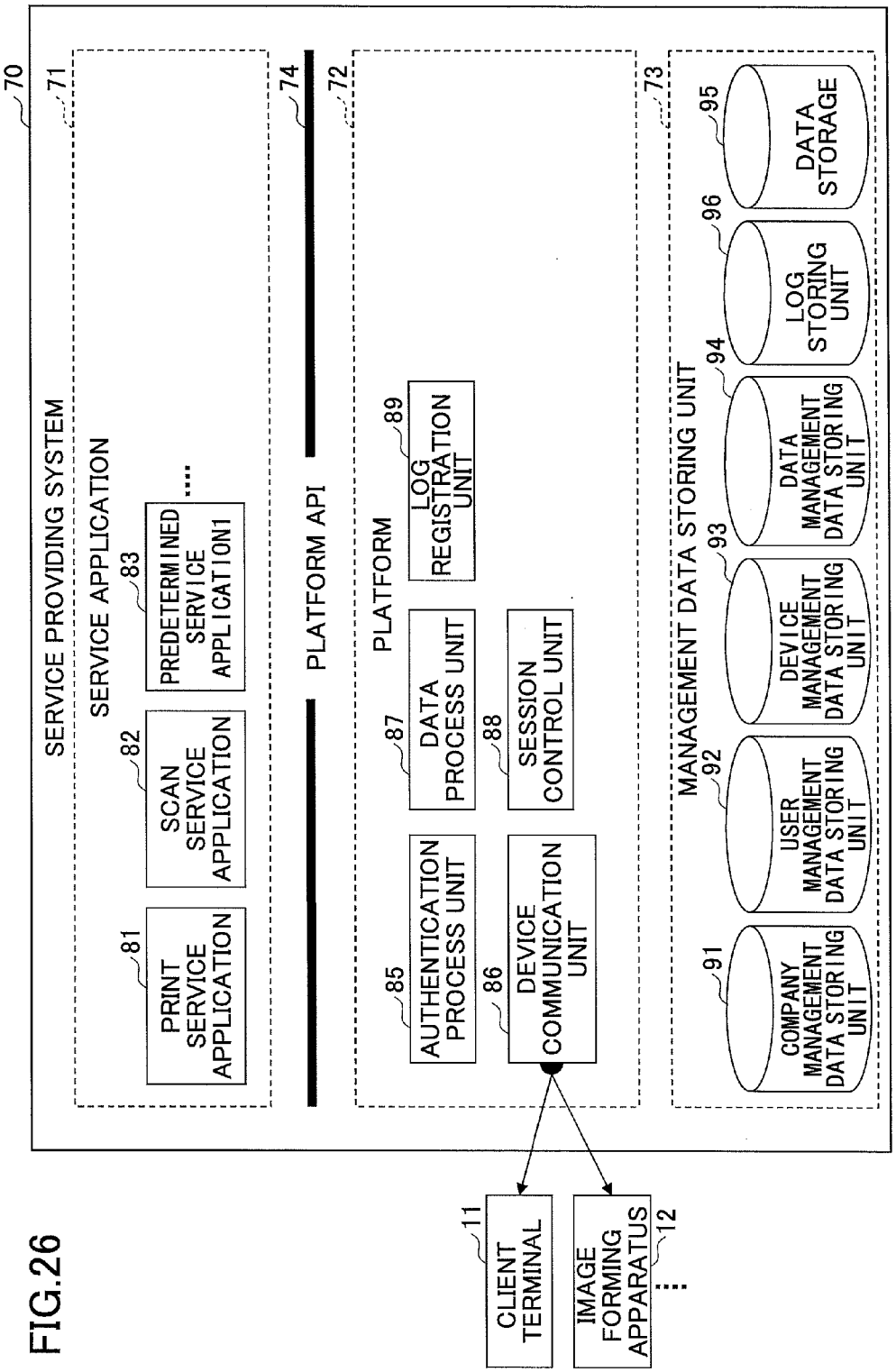
FIG. 26 is a functional block diagram illustrating an example of a software structure of the service providing system of the embodiment.

The functions of the service providing system 70 of the second embodiment are actualized by components illustrated in FIG. 26, for example. FIG. 26 is a functional block diagram illustrating an example of a software structure of the service providing system 70 of the second embodiment. The service providing system 70 illustrated in FIG. 26 further includes a log registration unit 89 and a log storing unit 96 in addition to the components of the service providing system 70 illustrated in FIG. 6.

The log registration unit 89 stores an output log received from the client terminal 11 in the log storing unit 96. The log storing unit 96 stores the output log, which will be explained later.

Figure 27:
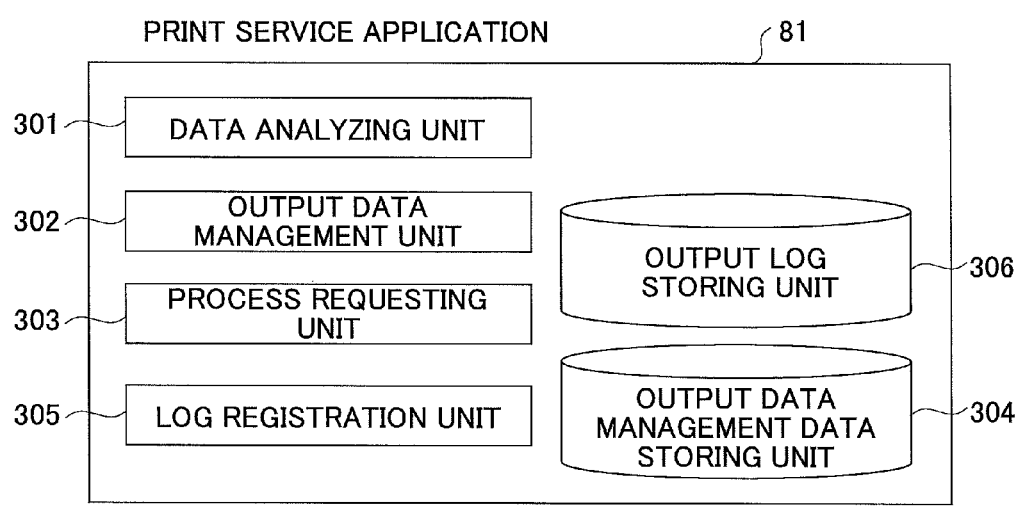
FIG. 27 is a functional block diagram illustrating an example of the print service application of the embodiment.

Further, as illustrated in FIG. 27, the service providing system 70 may include a log registration unit 305 and an output log storing unit 306 in the print service application 81 instead of the log registration unit 89 and the log storing unit 96 illustrated in FIG. 26. FIG. 27 is a functional block diagram illustrating an example of the print service application 81 of the embodiment. The print service application 81 illustrated in FIG. 27 further includes the log registration unit 305 and the output log storing unit 306 in addition to the components of the print service application 81 illustrated in FIG. 7.

The log registration unit 305 stores the output log received from the client terminal 11 in the output log storing unit 306. The output log storing unit 306 stores the output log, which will be explained later.

The log storing unit 96 of the service providing system 70 or the output log storing unit 306 of the print service application 81 stores the output log as illustrated in FIG. 28A and FIG. 28B, for example. FIG. 28A and FIG. 28B are views illustrating an example of the output log.

The output log illustrated in FIG. 28A includes data items such as "output data ID", "company code", "user information", "bibliographic data", "job ID", "status" and the like. The "status" indicates a status (already output, deleted or the like) of the print data corresponding to the output log. The output log illustrated in FIG. 28B further includes a data item "fixed value or input value" in addition to the data items of the output log illustrated in FIG. 28A. The "fixed value or input value" indicates whether a fixed value is used or an input value input by the user is used as ID when sending the output log.

(Process in Detail)
(Setting of Sending Log Process)

In the system 1 of the second embodiment, the user sets a setting of a sending log using a setting of a sending log screens illustrated in FIG. 29A, FIG. 29B and FIG. 29C. FIG. 29A, FIG. 29B and FIG. 29C are respective image diagrams illustrating an example of the setting of the sending log screen. In the setting of the sending log screens illustrated in FIG. 29A, FIG. 29B and FIG. 29C, one of sending conditions for the output log to the service providing system 70 such as "not to send", "send logs of all direct prints" and "send logs of direct prints of selected multifunction devices" can be selected. Further, in the setting of the sending log screens illustrated in FIG. 29A, FIG. 29B and FIG. 29C, whether to use the fixed value or the input value input by the user as the ID when sending the output log can be selected.

FIG. 29A illustrates an example when "not to send" is selected as the sending condition of the output log to the service providing system 70.

FIG. 29B illustrates an example when "send logs of direct prints of selected multifunction devices" is selected as the sending condition of the output log to the service providing system 70. In FIG. 29B, the input value input by the user is selected as the ID when sending the output log.

FIG. 29C illustrates an example when "send logs of all direct prints" is selected as the sending condition of the output log to the service providing system 70. In FIG. 29C, the fixed value is selected as the ID when sending the output log. The fixed value may be registered from a fixed value registration screen as illustrated in FIG. 30, for example.

(Output Data Inputting Process)

An example of a process to input print data from the client terminal 11 is as illustrated in FIG. 31, for example. FIG. 31 is a sequence diagram illustrating an example of an output data inputting process. The flowchart illustrated in FIG. 31 is similar to the flowchart illustrated in FIG. 17 except a part, and the same process is not repeated.

Processes of steps S201 to S212 illustrated in FIG. 31 are the same as the processes of steps S21 to S32 illustrated in FIG. 17. When it is determined that the destination to send the print data is the image forming apparatus 12, the output data sending control unit 44 requests the output log sending control unit 46 to determine whether to send the log in step S213.

In step S214, the output log sending control unit 46 determines whether to send an output log based on the setting of sending output log. When "not to send" as illustrated in FIG. 29A is selected, for example, the output log sending control unit 46 determines that it is unnecessary to send the output log.

Further, when "send logs of direct prints of selected multifunction devices" as illustrated in FIG. 29B is selected, for example, the output log sending control unit 46 determines it is necessary to send the output log when the selected multifunction device is the destination to send the print data.

Further, when "send logs of all direct prints" as illustrated in FIG. 29C is selected, the output log sending control unit 46 determines that it is necessary to send the output log.

When it is determined that the output log is to be sent, the output log sending control unit 46 requests the log-in requesting unit 45 to perform a log-in operation in step S215. The log-in requesting unit 45 displays a log-in data input screen for having the user input log-in data (authentication information) including user name, a password and the like.

Processes of steps S216 to S219 are the same as the processes of steps S34 to S38 illustrated in FIG. 17. In step S220, the log-in requesting unit 45 sends the authentication result as the log-in response to the output log sending control unit 46. When the authentication is a success, the log-in requesting unit 45 sends a token as well to the output log sending control unit 46.

In step S221, the output log sending control unit 46 requests the output log generation unit 47 to generate an output log. In step S222, the output log generation unit 47 generates the output log as illustrated in FIG. 28A and FIG. 28B. In step S223, the output log generation unit 47 sends the output log to the output log sending control unit 46.

In step S224, the output log sending control unit 46 requests the output data sending control unit 44 to send the print data. When the authentication is a success, the output log sending control unit 46 sends the token as well to the output data sending control unit 44. The process proceeds to step S225 and the output data sending control unit 44 sends the print data to the image forming apparatus 12. The image forming apparatus 12 prints the received print data. Then, in step S226, the output log sending control unit 46 sends the output log to the service providing system 70.

When it is determined not to send the output log, the output log sending control unit 46 requests the output data sending control unit 44 to send the print data in step S231. Here, when the authentication is a success, the output log sending control unit 46 sends the token as well to the output data sending control unit 44 in step S231. The process proceeds to step S232 and the output data sending control unit 44 sends the print data to the image forming apparatus 12.

The client terminal 11 sends an output log as illustrated in FIG. 32, for example. FIG. 32 is a flowchart illustrating an example of a process of sending the output log. The flowchart illustrated in FIG. 32 is similar to the flowchart illustrated in FIG. 18 except a part.

Processes of steps S251 to S259 are similar to the processes of step S61 to S69 illustrated in FIG. 18. In step S253, when the destination to send the print data is not the port "print service" of the print service providing apparatus 22 (NO in step S253), the process proceeds to step S260.

In step S260, the client terminal 11 determines whether to send an output log based on a setting of sending output log. When it is not a log sending mode in which the output log is to be sent (NO in step S260), the process proceeds to step S261 and the client terminal 11 sends the print data to the image forming apparatus 12.

When it is the log sending mode in which the output log is to be sent in step S260 (YES in step S260), the client terminal 11 determines whether the destination of the print data is the destination for which the output log is to be sent (the multifunction device selected in FIG. 29B) in step S262. When the destination to output the print data is not the destination for which the output log is to be sent (NO in step S262), the process proceeds to step S261 and the client terminal 11 sends the print data to the image forming apparatus 12.

When the destination to output the print data is the destination for which the output log is to be sent (YES in step S262), the client terminal 11 determines whether the fixed value is selected as the ID when sending the output log, in step S263.

When the fixed value is not selected as the ID when sending the output log(NO in step S263), the client terminal 11 displays the log-in data input screen 1020 as illustrated in FIG. 19 in step S264. In step S265, the client terminal 11 accepts an input of the log-in data to the log-in data input screen 1020 from the user.

In step S266, the client terminal 11 sends the log-in data to the service providing system 70 to request log-in. The service providing system 70 sends the authentication result to the client terminal 11.

In step S267, the client terminal 11 receives the authentication result from the service providing system 70. When the authentication result is not success (NO in step S267), the process returns back to step S264 and the client terminal 11 displays the log-in data input screen 1020 as illustrated in FIG. 19. On the other hand, when the authentication result is a success (YES in step S267), the client terminal 11 sends the token and the print data to the destination. Then, in step S269, the client terminal 11 sends the output log to the service providing system 70.

In step S263, when the fixed values is selected as the ID when sending the output log(YES in step S263), the process proceeds to step S265 and the client terminal 11 accepts the fixed value registered from the fixed value registration screen illustrated in FIG. 30 as the log-in data.

In step S266, the client terminal 11 sends the log-in data to the service providing system 70 to request log-in. The service providing system 70 sends the authentication result to the client terminal 11.

In step S267, the client terminal 11 receives the authentication result from the service providing system 70. When the authentication result is not success (NO in step S267), the process returns back to step S264 and the client terminal 11 displays the log-in data input screen 1020 as illustrated in FIG. 19. On the other hand, when the authentication result is a success (YES in step S267), the client terminal 11 sends the token and the print data to the destination. Then, in step S269, the client terminal 11 sends the output log to the service providing system 70.

According to the system 1 of the second embodiment, the output log of the direct print whose destination to send is the image forming apparatus 12 can be sent from the client terminal 11 to the service providing system 70. Thus, according to the system 1 of the second embodiment, the output log of the direct print whose destination to send is the image forming apparatus 12 can be registered in the service providing system 70 in addition to the output log whose destination to send is the print service.

Although the print data is exemplified as the output data, the output data is not so limited. For example, a projector may be used instead of the image forming apparatus 12 and a projection service may be used instead of the print service.

In the projection service, projection data (output data to be displayed) sent from the client terminal 11 is received and the projection data is sent to the projector in response to a request from the projector. The client terminal 11 may set the projection service or the projector as a destination to output the projection data. In such a case as well, by applying the present embodiment, the same effect obtained in the first embodiment or the second embodiment can be obtained.

The individual constituents of the system 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

According to the embodiment, a data processing apparatus and a system capable of accepting execution of different processes via a common user interface are provided.

Although a preferred embodiment of the data processing apparatus and the system has been specifically illustrated and described, it is to be understood that minor modifications may be made therein without departing from the spirit and scope of the invention as defined by the claims. The output apparatus, the service providing apparatus and the data processing apparatus defined in the claims may correspond to the image forming apparatus 12, the service providing system 70 and the client terminal 11, respectively.

The present invention is not limited to the specifically disclosed embodiments, and numerous variations and modifications and modifications may be made without departing from the spirit and scope of the present invention.

The present application is based on and claims the benefit of priority of Japanese Priority Application No. 2012-196952 filed on Sep. 7, 2012, the entire contents of which are hereby incorporated by reference.

What is claimed is:

1. A client apparatus comprising:
   a processor; and
   a memory,
   wherein the processor is configured to
      display a registration data input screen for a user to input a part of log-in data for logging into a service providing apparatus, and resister the part of the log-in data input via the registration data input screen in the memory,
      after the part of the log-in data is registered in the memory, accept a print request to a destination selected from among one or more destinations including the service providing apparatus by the user, the service providing apparatus storing print data of the print request, the service providing apparatus providing the stored print data to an output apparatus having logged into the service providing apparatus and the service providing apparatus not printing the print data, after the print request is accepted, display a first data input screen for the user to input log-in user data in response to the print request, when the selected destination in the print request is the service providing apparatus, request a log-in to the service providing apparatus using the log-in data including the part of the log-in data stored in the memory and the log-in user data input via the first data input screen, when the selected destination in the print request is the service providing apparatus, send the print request to the service providing apparatus after having logged into the service providing apparatus based on the log-in data, and send the print request to the output apparatus, when the selected destination of the print request is the output apparatus, wherein the output apparatus prints the print data of the print request received from the client apparatus or the service providing apparatus.

2. The client apparatus according to claim 1, wherein the memory stores a setting of the output apparatus, and wherein the service providing apparatus provides a cloud service.

3. The client apparatus according to claim 1,
wherein the processor is further configured to
determine whether to send a log based on a setting of a sending log for which a sending condition for log is set, when the destination of the print request is the output apparatus,
generate a log when it is determined that the log is to be sent, and
send the log to the service providing apparatus.

4. The client apparatus according to claim 3, wherein the setting of the sending log includes a first condition by which logs of sending the print data to all of the output apparatuses are to be sent as the logs, and a second condition by which a log of sending the print data to the selected output apparatus are to be sent as the log.

5. The client apparatus according to claim 3, wherein the setting of the sending log includes a setting of whether to use, as data for specifying a user who requested the print request of the print data, a fixed value that is previously registered or an input value input by the user.

6. A system comprising:
a client apparatus that sends output data;
an output apparatus that outputs print data; and
a service providing apparatus that provides a service related to the print data, the client apparatus, the output apparatus and the service providing apparatus being connected with each other via a network,
wherein the client apparatus includes a processor and a memory,
the processor being configured to
display a registration data input screen for a user to input a part of log-in data for logging into the service providing apparatus, and resister the part of the log-in data input via the registration data input screen in the memory,
after the part of the log-in data is registered in the memory, accept a print request to a destination selected from among one or more destinations including the service providing apparatus by the user, the service providing apparatus storing print data of the print request, the service providing apparatus providing the stored print data to an output apparatus having logged into the service providing apparatus and the service providing apparatus not printing the print data, after the print request is accepted, display a first data input screen for the user to input log-in user data in response to the print request, when the selected destination in the print request is the service providing apparatus, request a log-in to the service providing apparatus using the log-in data including the part of the log-in data stored in the memory and the log-in user data input via the first data input screen, when the selected destination in the print request is the service providing apparatus, send the print request to the service providing apparatus after having logged into the service providing apparatus based on the log-in data, and send the print request to the output apparatus, when the selected destination of the print request is the output apparatus, wherein the output apparatus prints the print data of the print request received from the client apparatus or the service providing apparatus.

7. The client apparatus according to claim 1, wherein the part of log-in data is identification information that identifies a group of users or a group of output apparatuses to which the respective user belongs.

8. The client apparatus according to claim 1,
wherein the memory stores a port monitor, and
wherein at least the functions of the processor including displaying the registration data input screen, displaying the first data input screen, requesting the log-in to the service providing apparatus, sending the print request to the service providing apparatus and sending the print request to the output apparatus are performed by the port monitor.

9. The system according to claim 6, wherein the client apparatus stores a setting of the output apparatus, and wherein the service providing apparatus provides a cloud service.

10. The system according to claim 6,
wherein the processor is further configured to
determine whether to send a log based on a setting of a sending log for which a sending condition for a log is set, when the destination of the print request is the output apparatus,
generate a log when it is determined that the log is to be sent, and
send the log to the service providing apparatus.

11. The system according to claim 10, wherein the setting of the sending log includes a first condition by which logs of sending the print data to all of the output apparatuses are to be sent as the logs and a second condition by which a log of sending the print data to the selected output apparatus are to be sent as the log.

12. The system according to claim 10, wherein the setting of the sending log includes a setting of whether to use, as data for specifying a user who requested the print request of the print data, a fixed value that is previously registered or an input value input by the user.

13. A non-transitory computer-readable recording medium having recorded thereon a program that causes a client apparatus, including a processor and a memory, to execute functions comprising:

displaying a registration data input screen for a user to input the part of the log-in data and resister the part of the log-in data input via the registration data input screen in the memory;

after the part of the log-in data is registered in the memory, accepting to a destination selected from among one or more destinations including the service providing apparatus by the user, the service providing apparatus storing print data of the print request, the service providing apparatus providing the stored print data to an output apparatus having logged into the service providing apparatus and the service providing apparatus not printing the print data;

after the print request is accepted, displaying a first data input screen for the user to input log-in user data in response to the print request, when the selected destination in the print request is the service providing apparatus;

requesting a log-in to the service providing apparatus using the log-in data including the part of the log-in data stored in the memory and the log-in user data input via the first data input screen, when the selected destination in the print request is the service providing apparatus;

sending the print request to the service providing apparatus after having logged into the service providing apparatus based on the log-in data; and sending the print request to the output apparatus, when the selected destination of the print request is the output apparatus, wherein the output apparatus prints the print data of the print request received from the client apparatus or the service providing apparatus.

14. The client apparatus according to claim 1,
wherein the processor is configured to display the first data input screen including the part of the log-in data stored in the memory and input boxes for the user to input the log-in user data.

15. The system according to claim 6,
wherein the processor is configured to display the first data input screen including the part of the log-in data stored in the memory and input boxes for the user to input the log-in user data.

16. The system according to claim 6, wherein the part of log-in data is identification information that identifies a group of users or a group of output apparatuses to which the respective user belongs.

17. The non-transitory computer-readable recording medium according to claim 13, wherein the part of log-in data is identification information that identifies a group of users or a group of output apparatuses to which the respective user belongs.

18. The system according to claim 6,
wherein the memory of the client apparatus stores a port monitor, and
wherein at least the functions of the processor of the client apparatus including displaying the registration data input screen, displaying the first data input screen, requesting the log-in to the service providing apparatus, sending the print request to the service providing apparatus and sending the print request to the output apparatus are performed by the port monitor.

19. The non-transitory computer-readable recording medium according to claim 13,
wherein the memory of the client apparatus stores a port monitor, and
wherein at least the functions executed by the client apparatus including the displaying the registration data input screen, the displaying the first data input screen, the requesting the log-in to the service providing apparatus, the sending the print request to the service providing apparatus and the sending the print request to the output apparatus are performed by a function of the port monitor.

* * * * *